United States Patent
Morimoto

(10) Patent No.: US 10,277,765 B2
(45) Date of Patent: Apr. 30, 2019

(54) INFORMATION PROCESSING DEVICE, CONTROL METHOD, AND PROGRAM

(71) Applicant: CANON KABUSHIKI KAISHA, Tokyo (JP)

(72) Inventor: Hiroaki Morimoto, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/870,440

(22) Filed: Jan. 12, 2018

(65) Prior Publication Data

US 2018/0220025 A1 Aug. 2, 2018

(30) Foreign Application Priority Data

Jan. 31, 2017 (JP) .................................. 2017-016203

(51) Int. Cl.
*G06F 3/12* (2006.01)
*H04N 1/00* (2006.01)

(52) U.S. Cl.
CPC ......... *H04N 1/00941* (2013.01); *G06F 3/123* (2013.01); *G06F 3/126* (2013.01); *H04N 2201/0094* (2013.01)

(58) Field of Classification Search
CPC ....... H04N 1/00941; H04N 2201/0094; H04N 1/0095; H04N 1/0092; H04N 1/00923; H04N 1/00915; H04N 1/00928; H04N 1/00931; H04N 1/00954; G06F 3/123; G06F 3/126
See application file for complete search history.

(56) References Cited

U.S. PATENT DOCUMENTS

| 5,905,582 A * | 5/1999 | Hirai | H04N 1/00206 358/442 |
| 6,633,402 B1 * | 10/2003 | Shima | G06F 3/1215 358/1.14 |
| 2005/0071495 A1 * | 3/2005 | Kadota | G03G 15/55 709/232 |
| 2011/0265100 A1 * | 10/2011 | Hanano | G06F 9/542 719/321 |
| 2011/0265102 A1 * | 10/2011 | Hanano | H04N 1/00241 719/328 |
| 2014/0063544 A1 * | 3/2014 | Kadota | G06F 13/385 358/1.15 |
| 2014/0118789 A1 * | 5/2014 | Kadota | G06F 3/121 358/1.15 |
| 2014/0247462 A1 * | 9/2014 | Saitoh | G06F 9/526 358/1.15 |
| 2015/0186085 A1 * | 7/2015 | Ito | G06F 3/1247 358/1.15 |

FOREIGN PATENT DOCUMENTS

JP 2006-215805 A 8/2006

* cited by examiner

*Primary Examiner* — Moustapha Diaby
(74) *Attorney, Agent, or Firm* — Canon U.S.A., Inc. IP Division

(57) ABSTRACT

A program is provided for causing a computer of a device having a predetermined program and at least one other program other than the predetermined program to execute acquiring processing for acquiring an exclusive object before the job is generated using the predetermined program and generating the job by means of the predetermined program in a state in which the acquired exclusive object is held.

20 Claims, 12 Drawing Sheets

INFORMATION PROCESSING DEVICE, CONTROL METHOD, AND PROGRAM

BACKGROUND OF THE INVENTION

Field of the Invention

The aspect of the embodiments relates to an information processing device, a control method, and a program.

Description of the Related Art

A form has been known, in which multiple programs including first and second programs operate in an information processing device configured so that a job can be transmitted to a communication device. In this form, a situation might occur, in which communication with a certain communication device based on an instruction by the first program and communication with the certain communication device based on an instruction by the second program are executed in parallel on the same communication path, for example.

However, in a case where communication with the certain communication device based on the instruction by the first program and communication with the certain communication device based on the instruction by the second program are executed in parallel, mixing of communicated data might occur, for example. For this reason, a form has been known, in which for reducing occurrence of mixing of the communicated data, control is executed such that communication with the certain communication device based on the instruction by the first program and communication with the certain communication device based on the instruction by the second program are not executed in parallel. Such control is called "exclusive control". Moreover, the information processing device in this form implements, for example, the exclusive control by acquiring information called an "exclusive object" from an OS of the information processing device. For example, a Mutex object as described in Japanese Patent Laid-Open No. 2006-215805 is utilized as the exclusive object.

With widespread use of a communication device configured to execute the exclusive control, a communication device configured so that more proper exclusive control can be executed has been demanded.

SUMMARY OF THE INVENTION

A method of the aspect of the embodiments is for controlling an information processing device having a predetermined program for generating a job for causing a communication device to execute image processing and at least one other program other than the predetermined program, the method is comprises:

executing, by means of the predetermined program, acquiring processing for acquiring an exclusive object before the job is generated; and generating the job by means of the predetermined program in a state in which the exclusive object acquired by means of the predetermined program is held, wherein the job is not generated by means of the predetermined program in a state in which the exclusive object is not acquired by means of the predetermined program, wherein the generated job is transmitted to the communication device in a state in which the exclusive object acquired by means of the predetermined program is held, in a state in which the exclusive object acquired by means of the predetermined program is not held, communication with the communication device based on the at least one other program is executable, and in a state in which the exclusive object acquired by means of the predetermined program is held, communication with the communication device based on the at least one other program is not performed, and in a case where the exclusive object acquired by means of the at least one other program is held, the exclusive object is not acquired by means of the predetermined program, and in a case where the exclusive object acquired by means of the at least one other program is not held, the exclusive object is acquired by means of the predetermined program.

Moreover, a method of the aspect of the embodiments is for controlling an information processing device having a predetermined program for generating a job for causing a communication device to execute image processing, the method comprises:

transmitting an instruction to a server before the job is generated by means of the predetermined program, the instruction being for executing acquiring processing for acquiring an exclusive object by means of a predetermined server-side program of the server; and generating the job by means of the predetermined program in a state in which the exclusive object acquired by means of the predetermined server-side program is held, wherein the job is not generated by means of the predetermined program in a state in which the exclusive object is not acquired by means of the predetermined program, wherein the generated job is transmitted to the communication device via the server in a state in which the exclusive object acquired by means of the predetermined server-side program is held, and in a state in which the exclusive object acquired by means of the predetermined server-side program is not held, communication with the communication device based on at least one program of the server other than the predetermined server-side program is executable, and in a state in which the exclusive object acquired by means of the predetermined server-side program is held, communication with the communication device based on the at least one other program of the server other than the predetermined server-side program is not performed.

Further features of the disclosure will become apparent from the following description of exemplary embodiments (with reference to the attached drawings).

DESCRIPTION OF THE EMBODIMENTS

Embodiments of the disclosure will be described below in detail with reference to the attached drawings. Note that the following embodiments are not intended to limit the disclosure according to the scope of the claims, and all of combinations of features described in the present embodiments are not essential for solutions in the disclosure.

First Embodiment

A communication device to which the aspect of the embodiments is applied will be described. The communication device is a device configured so that a job can be received from an information processing device. In the present embodiment, an inkjet type multi-function peripheral (MFP) is described as an example of the communication device. The MFP is a device having multiple functions, such as a printer, a scanner, a copier, and a facsimile. Note that the communication device may be, for example, a copy machine, a facsimile device, a scanner, a personal computer (PC), a smartphone, a tablet terminal, a personal digital assistant (PDA), a digital camera, and a music reproduction device. In a case where the communication device is a printer, a print method to be utilized is not limited to an inkjet method, and may be, e.g., an electrophotographic method. Further, the communication device is not necessarily the MFP, and may be a single-function device (SFP). The information processing device is a device configured so that the job can be transmitted to the communication device. In the present embodiment, a mobile terminal is described as an example of the information processing device. Note that the information processing device may be, for example, a PC, a smartphone, a tablet terminal, a PDA, or a camera. Moreover, in description below, a print job for causing the communication device to execute print processing is described as an example of the job handled between the information processing device and the communication device, but such a job is not limited to this form. For example, the job may be a scan job for causing the communication device to execute scan processing or a copy job for causing the communication device to execute copy processing. Note that the print processing described herein indicates the processing of using a recording material such as ink to form an image on a recording medium such as paper. Moreover, the scan processing indicates the processing of reading an original document by a not-shown scanner section to generate image data based on the original document.

Figure 1:
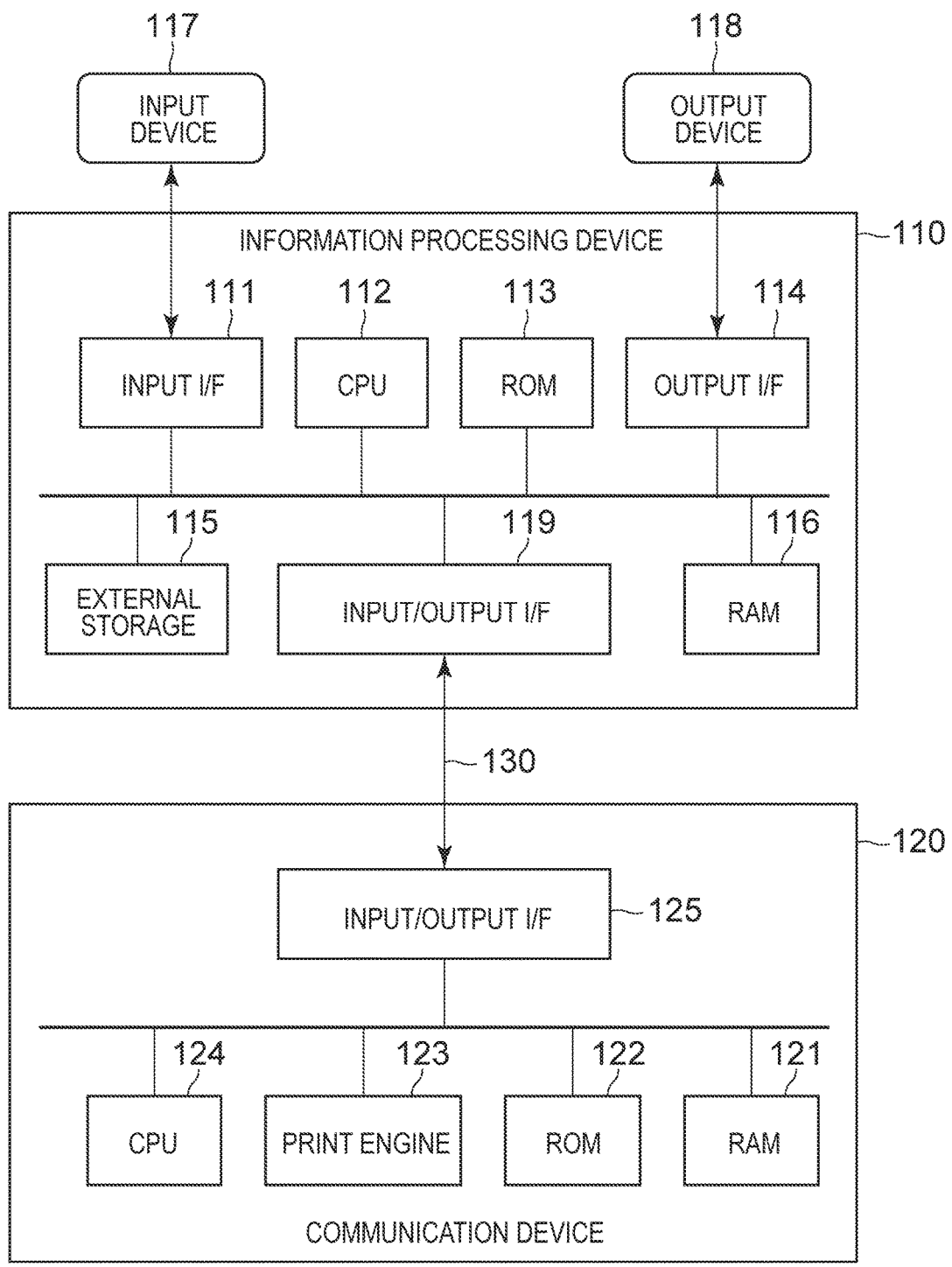
FIG. 1 is a block diagram of a print system including a communication device and an information processing device.

FIG. 1 is one example of a block diagram of an entire configuration of a communication system including an information processing device 110 and a communication device 120 connected to the information processing device 110. The information processing device 110 has an input I/F 111, a CPU 112, a ROM 113, an output I/F 114, an external storage device 115, a RAM 116, an input device 117, an output device 118 (a display section), and an input/output I/F 119. The CPU 112 is configured to control the information processing device 110 according to a control instruction saved in, e.g., the ROM 113. The ROM 113 is configured to store an initialization program, and the external storage device 115 is configured to store a control program and a built-in operating system (hereinafter referred to as an "OS") executed by the CPU 112, a printer driver, and various other types of data. In the present embodiment, the control program stored in the external storage device 115 performs software control such as scheduling and task switch under the control of the built-in OS stored in the external storage device 115. The RAM 116 is used as a work memory for various programs saved in the external storage device 115. The input device 117 is used for data input and operation instruction, and is connected to the input I/F 111. The output device 118 is used for data displaying and state notification, and is connected to the output I/F 114.

The communication device 120 includes a RAM 121, a ROM 122, a print engine 123, a CPU 124, and an input/output I/F 125. The information processing device 110 and the communication device 120 are connected together via a universal serial bus (USB) (registered trademark) cable 130. That is, in the present embodiment, communication between the communication device 120 and the information processing device 110 is performed by a USB communication method. Note that communication between the communication device 120 and the information processing device 110 may be, for example, performed by other methods (a wireless communication method etc.) than the USB communication method, or may be in such a form that use of any communication method can be selected. The RAM 121 is used as a work memory of the CPU 124, and is also utilized as a buffer for temporarily saving received data. The ROM 122 is configured to save a control instruction. The print engine 123 is configured to perform printing based on the data saved in the RAM 121. The CPU 124 is configured to control the communication device 120 according to the control instruction saved in the ROM 122 etc. Note that in the present embodiment, processing sharing between the information processing device 110 and the communication device 120 has been described above, but the form of processing sharing is not limited to above.

In the present embodiment, the printer driver included in the information processing device 110 is a Version X driver (where X is a positive integer number) (i.e., Version 3 driver (a V3 driver) or a Version 4 driver (a V4 driver) employed by Windows (registered trademark) of Microsoft Corporation). Note that the printer driver is, for example, activated in a case where a user instructs printing execution via an application.

Software configurations included in the information processing device 110 in a case where the printer driver included in the information processing device 110 is the V3 driver will be described herein. Moreover, typical processing executed by the information processing device 110 in a case where the printer driver included in the information processing device 110 is the V3 driver will be described.

Figure 2:
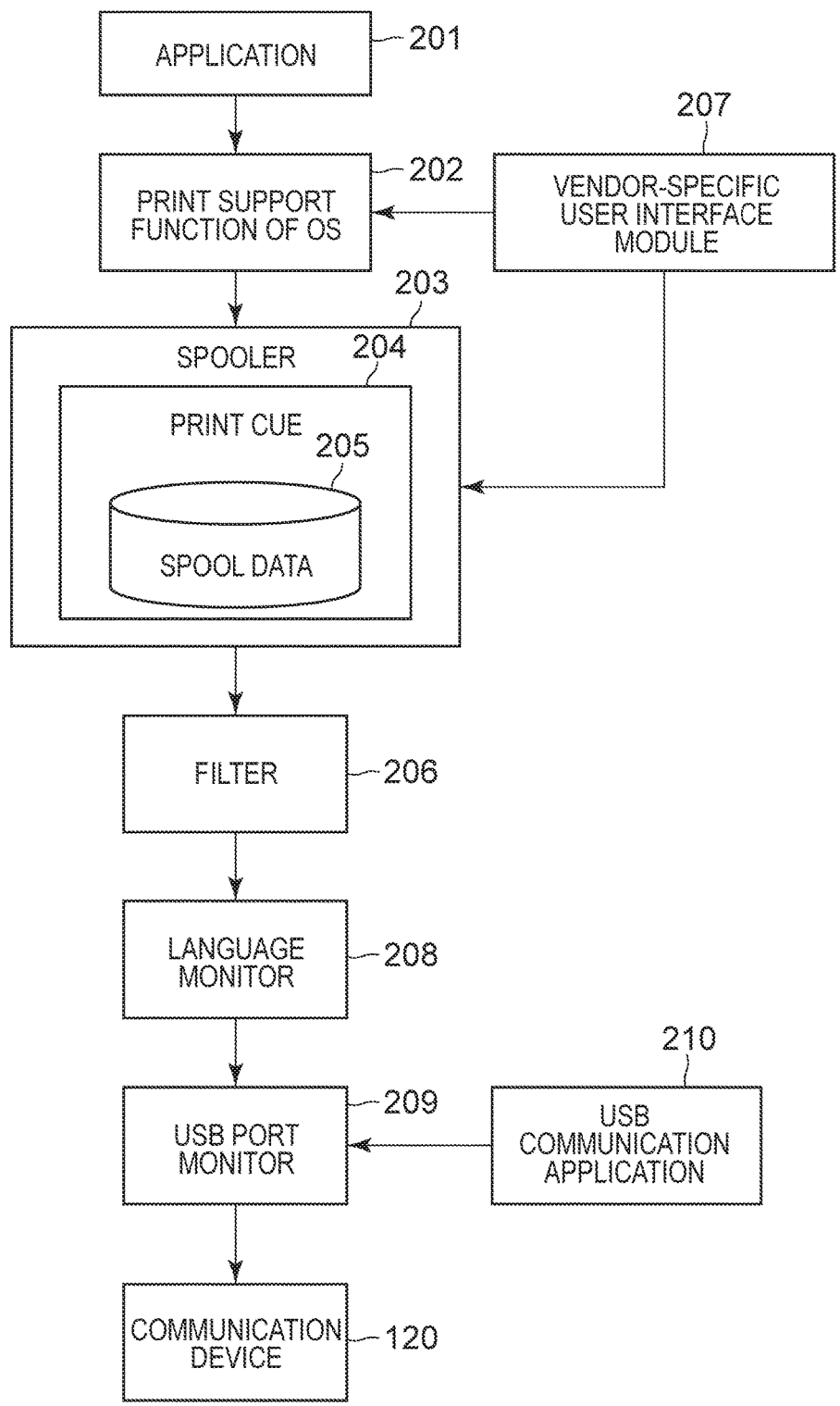
FIG. 2 illustrates software configurations included in the information processing device in a case where a printer driver included in the information processing device is a V3 driver.

FIG. 2 is a diagram of the software configurations included in the information processing device 110 in a case where the printer driver included in the information processing device 110 is the V3 driver. The processing executed by each configuration is actually implemented in such a manner that the CPU 112 reads the program corresponding to each configuration from the external storage device 115 and loads the program on the RAM 116 to execute the program.

Of the configurations illustrated in FIG. 2, the configurations 202, 203, 204, and 209 form an OS module, and the configurations 206, 207, and 208 form a printer driver module. However, each configuration may form any of the OS module and the printer driver module.

An application 201 is an application program saved in the external storage device 115, and has the function of producing print data including, e.g., image information such as paid contents to be printed, drawing information containing character information, and print setting information such as a paper size and a layout. Note that the application 201 starts print data production in response to print instruction input received from the user. The print data produced by the application 201 is, as spool data 205, temporarily accumulated in a job cue 204 of a spooler 203 via the OS print support function 202. Note that the application 201 adds, to the print data, the print setting information received from the vendor-specific user interface module 207 via the OS print support function 202. Note that the print setting information to be received is, for example, information on print settings set/input by the user via the vendor-specific user interface module 207 before reception of the print instruction input from the user. The vendor-specific user interface module 207 is a module for displaying a print setting screen designed as necessary by a vendor of the printer driver. The user performs operation for the print setting screen so that an optional print setting can be input.

The spooler 203 has a job management function, and is configured to hold and manage the supplied spool data 205 until it is recognized that transmission of the print job corresponding to the spool data 205 has been completed. Specifically, the spooler 203 manages, for each printer, a print job size, a job name, the order of transmitting the job, etc., and transmits the managed information to a status display application. In this manner, the spooler 203 displays such information on the output device 118 etc. Moreover, in preparation for occurrence of an error such as paper-jamming, the spooler 203 may hold the print job itself containing the print data until the end of the job. Note that the information of the spool data 205 saved in the job cue 204 can be, for example, referred to via the vendor-specific user interface module 207, the application 201, etc. by means of a predetermined interface function.

The command generation filter 206 is configured to generate the print job in such a manner that the spool data 205 accumulated in the job cue 204 is, based on the print setting information added to the spool data 205, converted into the print job interpretable by the communication device 120.

That is, the command generation filter 206 operates as a generation module for generating the print job. Note that the processing of inputting the print data to the command generation filter 206, the processing of converting the print data by the command generation filter 206, etc. are controlled by a not-shown OS command generation filter control function. Subsequently, the command generation filter 206 sequentially outputs the generated print job to the RAM 116 and the external storage device 115 of the information processing device 110. Then, the print job output to the RAM 116 and the external storage device 115 is sequentially processed according to the processing order managed by the spooler 203. In the case of processing the print job, the print job is first read by the spooler 203, and is divided into each packet with a specific size. Then, the divided jobs are sequentially output to the language monitor 208. Each of multiple jobs acquired by division of a single print job will be hereinafter referred to as a "divided job". That is, a combination of multiple divided jobs forms a single print job.

The language monitor 208 is a module having the function (a bi-directional communication function) of performing bi-directional communication with the communication device 120. Specifically, the language monitor 208 sequentially inputs the input divided jobs to the USB port monitor 209. In this manner, the print job is transmitted to the communication device 120. Moreover, the language monitor 208 also has the function of acquiring information such as the status of the communication device 120 and a job processing status from the communication device 120.

For example, there is an information processing device 110 configured so that the settings for the bi-directional communication function can be changed. In this information processing device 110, the language monitor 208 operates in the case of setting the bi-directional communication function as valid. That is, the print job is transmitted to the communication device 120 via the language monitor 208. Moreover, the information such as the status of the communication device 120 and the job processing status are acquired as necessary by the language monitor 208. On the other hand, in the case of setting the bi-directional communication function as invalid, the language monitor 208 does not operate. In this case, the print job is transmitted to the communication device 120 without the language monitor 208. Specifically, the print job is directly input from the spooler 203 to the USB port monitor 209. Moreover, the information such as the status of the communication device 120 and the job processing status is not acquired by the language monitor 208. That is, in a state in which the bi-directional communication function is set as invalid, the printer driver performs only unidirectional communication (data transmission) with the communication device 120.

The USB port monitor 209 is a module for controlling communication via the USB. Specifically, the USB port monitor 209 transmits, to a device controlled by the USB port monitor 209, the print job input from the language monitor 208. Moreover, the USB port monitor 209 performs, according to various commands input from the USB communication application 210, communication with the device controlled by the USB port monitor 209. In the present embodiment, the information processing device 110 is connected to the communication device 120 via the USB, and therefore, the device controlled by the USB port monitor 209 is the communication device 120. Note that in a case where there are, for example, multiple devices connected via the USB, multiple USB port monitors 209 may be present. In this case, a single USB port monitor 209 controls a single device connected via the USB. The language monitor 208 and the USB communication application 210 input the information to one of the multiple USB port monitors 209 controlling a device as a communication partner.

The USB communication application 210 is an application program for performing communication with the device controlled by the USB port monitor 209. Specifically, the USB communication application 210 is, for example, a program for examining the use status of the communication device 120 or a program for acquiring detailed information (history) on the job processed by the communication device 120. In the case of performing communication with the device controlled by the USB port monitor 209, the USB communication application 210 inputs, to the USB port monitor 209, the command corresponding to control that the USB communication application 210 is intended to execute.

Note that the USB communication application 210 is a program separated from the printer driver, and performs communication with the device controlled by the USB port monitor 209 by control independently of that of the printer driver (i.e., not taking the operation state of the printer driver into consideration). That is, the USB communication application 210 operates by the control independently of that of the printer driver. Thus, a situation might be caused, in which USB communication with a certain communication device by the USB communication application 210 and USB communication with the certain communication device by the printer driver are executed in parallel on the same communication path.

However, in a case where USB communication by the USB communication application 210 and USB communication by the printer driver are executed in parallel on the same communication path, there is a probability that communicated data is mixed, for example. Moreover, there is a probability that a response to USB communication by the USB communication application 210 from the communication device 120 is acquired by the printer driver. For avoiding occurrence of such a situation, the information processing device 110 executes such control (exclusive control) that USB communication by the USB communication application 210 and USB communication by the printer driver are not executed in parallel on the same communication path.

Specifically, in the case of performing USB communication by a certain module, the information processing device 110 causes this module to acquire information called an "exclusive object". More specifically, this module instructs the OS of the information processing device 110 to generate the exclusive object. Then, the exclusive object produced by the OS is acquired by the module. The exclusive object is information utilized for the exclusive control, and is also information such as a Mutex object. Note that the Mutex object is information utilized in an exclusive control mechanism called a "mutual exclusion service (Mutex)". The exclusive object may be, for example, a predetermined flag or a file for the exclusive control.

The information processing device 110 performs such control that USB communication is executed by the module holding the exclusive object and USB communication is not executed by the module not holding the exclusive object in the state of holding the exclusive object by a certain module. That is, in a case where the exclusive object is acquired/held by a predetermined program of the information processing device 110, communication with the communication device 120 by other programs for the exclusive control than the predetermined program among the programs of the information processing device 110 is not performed. By such control, control can be performed such that USB communication by the USB communication application 210 and USB communication by the printer driver are not executed in parallel on the same communication path.

Note that in the case of deleting the exclusive object by the predetermined program, USB communication with the communication device 120 by other programs than the predetermined program holding the exclusive object among the programs of the information processing device 110 becomes executable.

Figure 4:
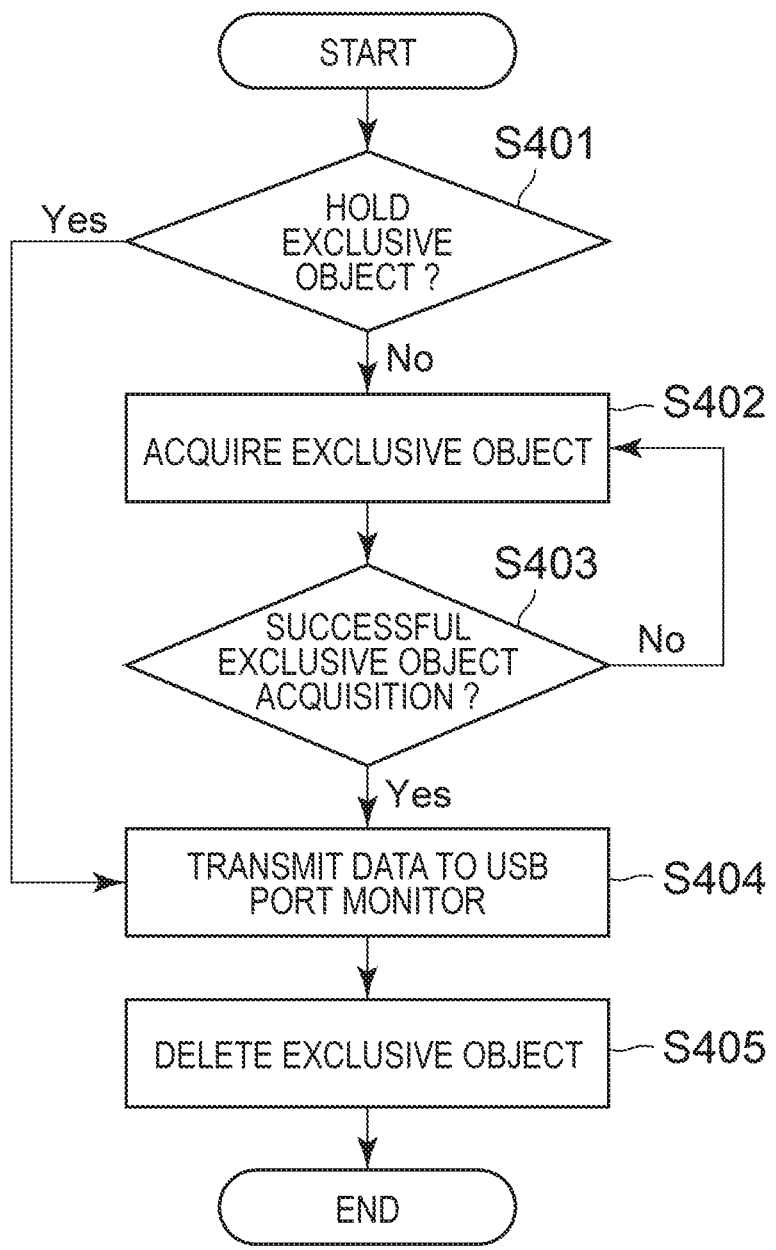
FIG. 4 is a flowchart of processing executed by a USB communication application.

FIG. 4 is a flowchart of the processing executed by the USB communication application 210. The processing executed by the USB communication application 210 is actually implemented in such a manner that the CPU 112 reads the program corresponding to the USB communication application 210 from the external storage device 115 and loads the program on the RAM 116 to execute the program. Note that the processing shown by this flowchart starts in a case where the USB communication application 210 starts communication with the device controlled by the USB port monitor 209.

First, the USB communication application 210 determines, at S401, whether or not the exclusive object associated with the USB port monitor 209 utilized for communication is held. The USB communication application 210 proceeds to S404 in a case where it is determined that the exclusive object is held, and proceeds to S402 in a case where it is determined that the exclusive object is not held.

At S402, the USB communication application 210 attempts to acquire (exclusive object acquiring processing) the exclusive object associated with the USB port monitor 209 utilized for communication. Note that in a state in which this exclusive object is held by software other than the USB communication application 210, such as the configuration (e.g., the language monitor 208) of the printer driver, the USB communication application 210 cannot acquire the exclusive object. That is, in this state, the exclusive object acquiring processing is failed. In a case where the exclusive object acquiring processing is successfully performed, the USB communication application 210 acquires the exclusive object.

Next, the USB communication application 210 determines, at S403, whether or not the exclusive object acquiring processing of S402 is successfully performed. In a case where it is determined that the exclusive object acquiring processing is successfully performed, the USB communication application 210 proceeds to S404. On the other hand, in a case where it is determined that the exclusive object acquiring processing is not successfully performed (i.e., failed), the USB communication application 210 executes the processing of S402 again, and repeats such processing until the exclusive object acquiring processing is successfully performed. That is, the USB communication application 210 repeats the processing until the exclusive object can be newly acquired by deleting of the exclusive object from the software other than the USB communication application 210. Note that in this state, the USB communication application 210 may proceed to S404 in a case where the number of repetitions of the processing exceeds a predetermined number. Alternatively, the USB communication application 210 may proceed to S404 in a case where the time spent for repetition of the processing exceeds a predetermined time (i.e., a state in which the exclusive object is not held by the USB communication application 210 continues for the predetermined time or longer). With this configuration, a situation can be reduced, in which data communication cannot be executed indefinitely in a case where the exclusive object cannot be acquired due to an error etc.

As another alternative, the USB communication application 210 may determine whether or not the exclusive object is held by the software other than the USB communication application 210, and may proceed to S404 in a case where it is determined that the exclusive object is not held, for example. This is because there is a case where the exclusive object acquiring processing is, in a case where an error is caused in the OS, failed regardless of the exclusive object being not held by the software other than the USB communication application 210, for example. As still another alternative, the USB communication application 210 may terminate, for example, the processing without transmission of later-described predetermined data. Moreover, in this state, the USB communication application 210 may display a screen for providing notification of an error on the output device 118.

At S404, the USB communication application 210 transmits the predetermined data to the USB port monitor 209 utilized for communication. Specifically, the USB communication application 210 inputs, together with a function for transmitting the data to the communication device 120 via the USB port monitor 209, the predetermined data to the USB port monitor 209. Note that the predetermined data is specifically a command on a function that the USB communication application 210 is intended to execute or information that the USB communication application 210 is intended to transmit to the communication device 120.

Next, the USB communication application 210 deletes, at S405, the held exclusive object, and transitions from the state of holding the exclusive object to the state of not holding the exclusive object. Subsequently, the USB communication application 210 terminates the processing.

As described above, when performing communication with the device controlled by the USB port monitor 209, the USB communication application 210 acquires the exclusive object associated with the USB port monitor 209 utilized for communication. Thus, while the USB communication application 210 is performing communication via the USB port monitor 209, communication via the USB port monitor 209 by the software, such as the printer driver, different from the USB communication application 210 is not performed. With this form, mixing of the print job transmitted by the printer driver and the data communicated by the USB communication application 210 can be reduced, for example.

Figure 3:
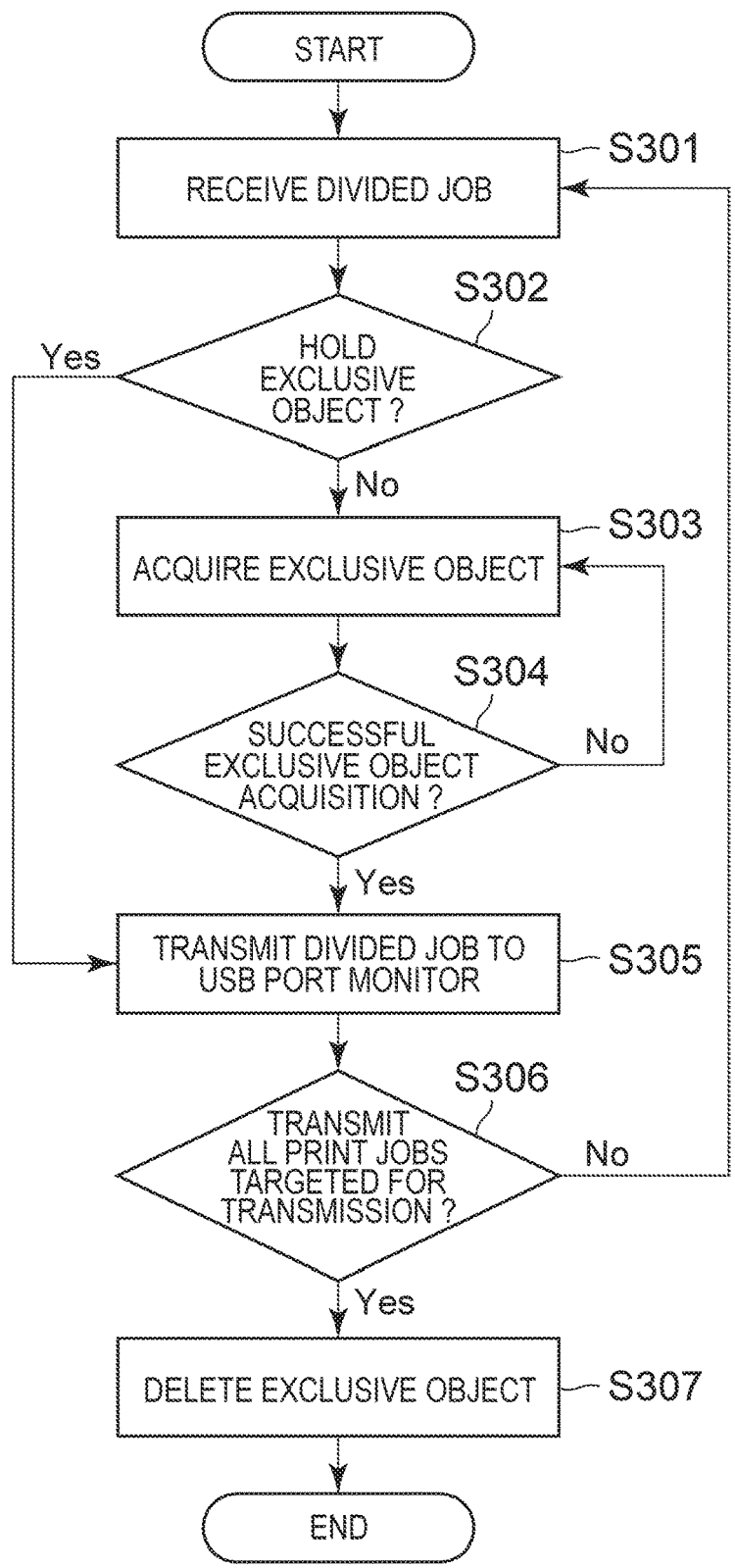
FIG. 3 is a flowchart of typical processing executed by a language monitor in the V3 driver upon transmission of a print job.

FIG. 3 is a flowchart of the typical processing executed by the language monitor 208 in the V3 driver upon transmission of the print job. Note that the processing executed by the language monitor 208 is actually implemented in such a manner that the CPU 112 reads the program corresponding to the language monitor 208 from the external storage device 115 and loads the program on the RAM 116 to execute the program. Moreover, the processing shown by this flowchart is executed after at least a portion of the print job has been generated by the command generation filter 206.

The language monitor 208 receives the divided job from the spooler 203 at S301. Note that the spooler 203 divides the print job to transmit each divided job to the language monitor 208. Thus, the language monitor 208 receives, in this state, a portion of the print job generated by the command generation filter 206.

Next, the language monitor 208 determines, at S302, whether or not the exclusive object associated with the USB port monitor 209 as a transfer destination of the received divided job is held. The language monitor 208 proceeds to S303 in a case where it is determined that the exclusive object is not held, and proceeds to S305 in a case where it is determined that the exclusive object is held.

At S303, the language monitor 208 attempts to acquire (the exclusive object acquiring processing) the exclusive object associated with the USB port monitor 209 as the transfer destination of the received divided job. Note that in a state in which this exclusive object is held by software other than the language monitor 208, such as the USB communication application 210, the language monitor 208 cannot acquire the exclusive object. That is, in this state, the exclusive object acquiring processing is failed. In a case where the exclusive object acquiring processing is successfully performed, the language monitor 208 acquires the exclusive object.

Next, the language monitor 208 determines, at S304, whether or not the exclusive object acquiring processing of S303 is successfully performed. In a case where it is determined that the exclusive object acquiring processing is successfully performed, the language monitor 208 proceeds to S305. On the other hand, in a case where it is determined that the exclusive object acquiring processing is not successfully performed (i.e., failed), the language monitor 208 executes the processing of S303 again, and repeats such processing until the exclusive object acquiring processing is successfully performed. Note that in this state, the language monitor 208 may proceed to S305 in a case where the number of repetitions of the processing exceeds a predetermined number or a case where the time spent for repetition of the processing exceeds a predetermined time. With this configuration, a situation can be reduced, in which data communication cannot be executed indefinitely in a case where the exclusive object cannot be acquired due to an error etc. Alternatively, the language monitor 208 may determine whether or not the exclusive object is held by the software other than the language monitor 208, and may proceed to S305 in a case where it is determined that the exclusive object is not held, for example. As another alternative, the language monitor 208 may terminate the processing without transmission of the print job, for example. Moreover, in this state, the language monitor 208 may display a screen for providing notification of an error on the output device 118. Specifically, the language monitor 208 may instruct the module or OS having the function of displaying the print job or information on the communication device 120 on the output device 118 to display the screen for providing notification of the error.

At S305, the language monitor 208 transmits the divided job to the USB port monitor 209. Specifically, the language monitor 208 inputs, together with the function for transmitting the data to the communication device 120 via the USB port monitor 209, the divided job to the USB port monitor 209.

Then, the language monitor 208 determines, at S306, whether or not the entire print job targeted for transmission (i.e., all of the divided jobs corresponding to the print job targeted for transmission) has been transmitted. The language monitor 208 proceeds to S307 in a case where it is determined that the entire print job targeted for transmission has been transmitted. In a case where it is determined that the entire print job targeted for transmission has not been transmitted yet, the language monitor 208 returns to S301, thereby receiving the remaining portion of the print job targeted for transmission (i.e., an unsent divided job(s)). Note that the language monitor 208 analyzes the divided job received at S301 so that it can be determined whether or not this divided job is the lastly-transmitted divided job of the multiple divided jobs acquired by division of the print job targeted for transmission. Then, in a case where it is determined as being the lastly-transmitted divided job, the language monitor 208 determines that the entire print job targeted for transmission has been transmitted. In a case where it is determined as not being the lastly-transmitted divided job, the language monitor 208 determines that the entire print job targeted for transmission has not been transmitted yet. In the case of transmitting the entire print job targeted for transmission to the USB port monitor 209, the print job targeted for transmission is transmitted to the communication device 120. Thus, the language monitor 208 can be regarded as having transmitted the entire print job targeted for transmission to the communication device 120. In this manner, printing based on the print job targeted for transmission is executed by the communication device 120.

The language monitor 208 deletes the held exclusive object at S307.

Subsequently, the language monitor 208 terminates the processing.

As described above, when the print job is transmitted to the device controlled by the USB port monitor 209, the language monitor 208 acquires the exclusive object associated with the USB port monitor 209 utilized for transmission. Specifically, after having received the print job generated by the command generation filter 206, the language monitor 208 acquires the exclusive object. Thus, while the language monitor 208 is transmitting the print job via the USB port monitor 209, communication via the USB port monitor 209 by the software, such as the printer driver, different from the USB communication application 210 is not performed. With this form, mixing of the print job transmitted by the printer driver and the data communicated by the USB communication application 210 can be reduced, for example.

However, the language monitor 208 has a role in acquisition of the exclusive object in the above-described form, and therefore, this form cannot be applied to an information processing device 110 having a printer driver without a language monitor 208, such as the V4 driver. Moreover, in the V3 driver, the language monitor 208 does not operate, as described above, in the case of the invalid bi-directional communication function. Thus, the above-described form cannot be applied to an information processing device 110 having a printer driver with an invalid bi-directional communication function, for example.

Moreover, in a case where the job is, for example, not transmitted for a long time due to continuous failure in acquisition of the exclusive object due to some reasons, transmission of the job might be canceled by an instruction from the user or the printer driver. Note that acquisition of the exclusive object is failed in a case where other programs than the program attempting to acquire the exclusive object have already held the exclusive object or a case where an error is caused, for example. Job generation processing is, in such a form that the exclusive object is acquired after generation of the print job as in the above-described form, uselessly performed in a case where transmission of the job is canceled, for example.

Specifically, in the form described below, acquisition of the exclusive job is not executed by the language monitor 208, but is executed by the command generation filter 206. Moreover, in the form described below, acquisition of the exclusive object is executed before the print job is generated by the command generation filter 206. Note that under such environment that the language monitor 208 is not provided or does not operate (i.e., invalidated), transmission of the generated print job to the communication device 120 promptly starts when the print job is generated by the command generation filter 206. For this reason, acquisition of the exclusive object is executed before the print job is generated by the command generation filter 206, and therefore, transmission of the print job before acquisition of the exclusive object can be reduced.

Note that a form in which the printer driver included in the information processing device 110 is the V4 driver will be described below, but the aspect of the embodiments is also applicable to a form in which the printer driver included in the information processing device 110 is other driver (e.g., the V3 driver) than the V4 driver.

Figure 5:
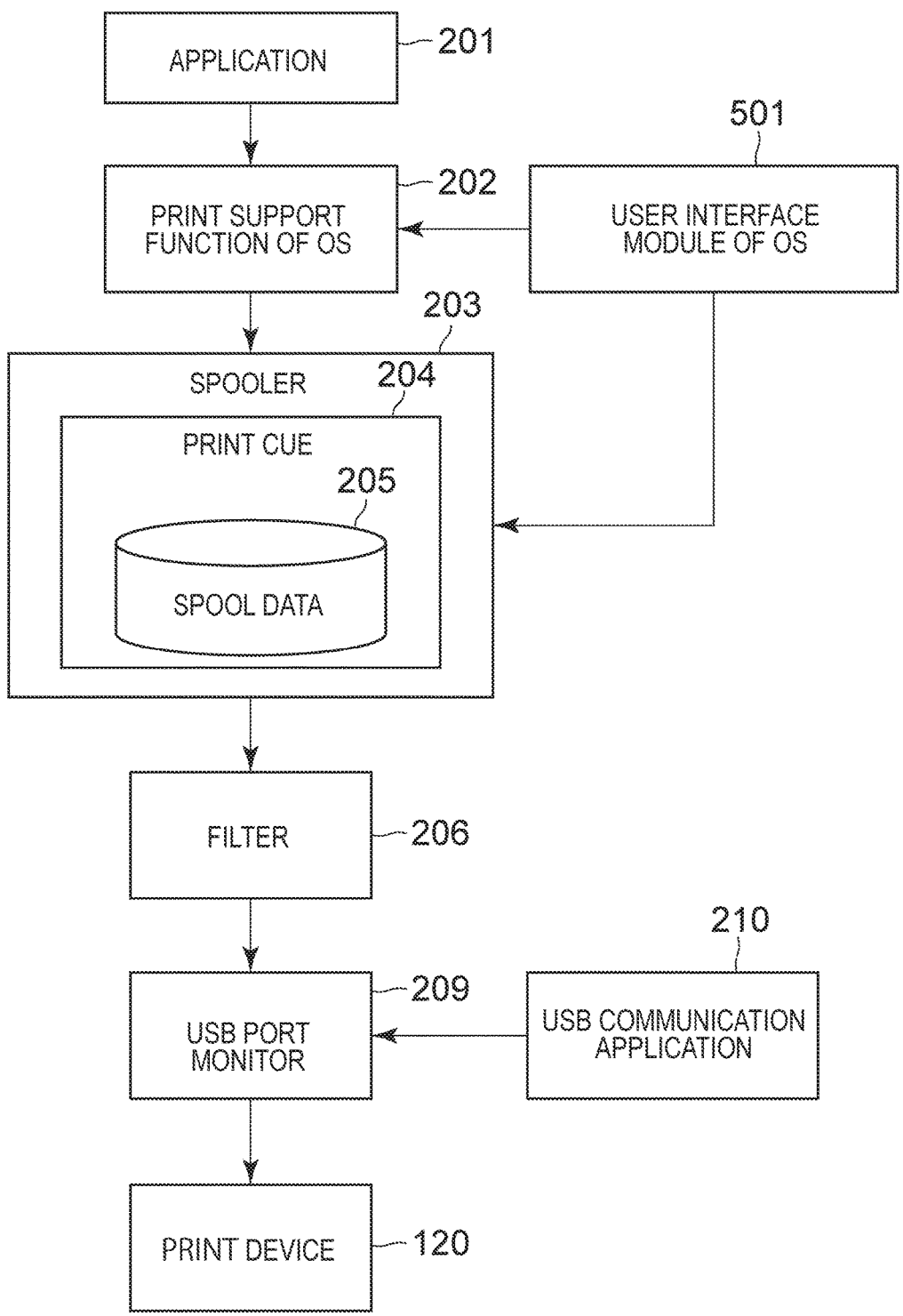
FIG. 5 illustrates software configurations included in the information processing device in a case where the printer driver included in the information processing device is a V4 driver.

FIG. 5 illustrates the software configurations included in the information processing device 110 in a case where the printer driver included in the information processing device 110 is the V4 driver. The processing executed by each configuration is actually implemented in such a manner that the CPU 112 reads the program corresponding to each configuration from the external storage device 115 and loads the program on the RAM 116 to execute the program. Description of configurations similar to those described with reference to FIG. 2 will not be repeated.

Of the configurations illustrated in FIG. 5, the configurations 202, 203, 204, 209, and 501 form the OS module, and the configuration 206 forms the printer driver module. However, each configuration may form any of the OS module and the printer driver module.

Unlike the V3 driver, the V4 driver does not have the vendor-specific user interface module 207 and the language monitor 208. Thus, the V4 driver is in such a state that the bi-directional communication function is constantly set as invalid.

Moreover, under V4 driver environment, the OS has an OS user interface module 501. The OS user interface module 501 is, as in the vendor-specific user interface module 207, configured to display a screen for receiving print setting input received from the user. Moreover, the OS user interface module 501 supplies information on the received print settings to the application 201, thereby adding the print setting information to the print data.

Figure 6:
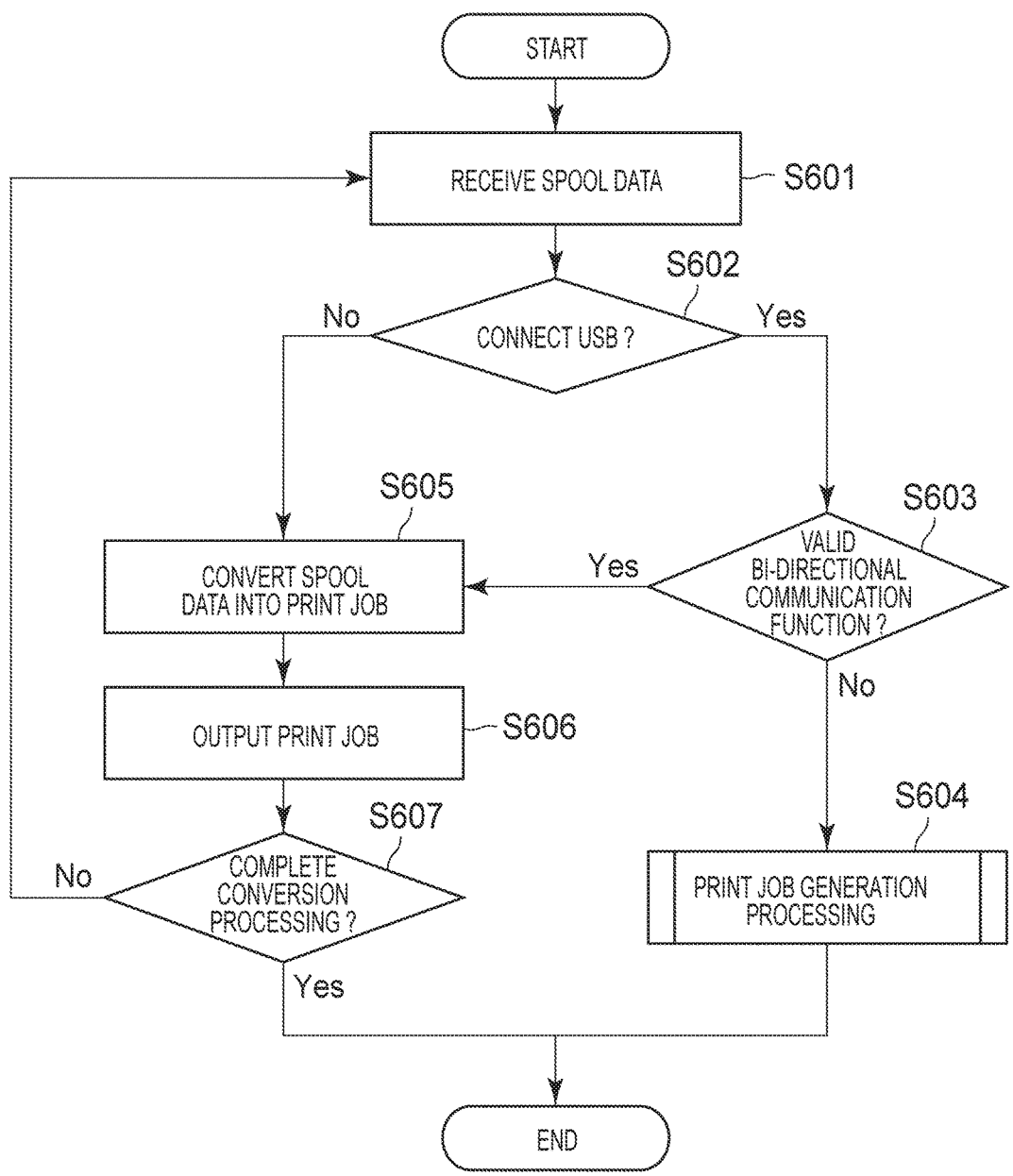
FIG. 6 is a flowchart of processing executed by a command generation filter upon transmission of the print job.

FIG. 6 is a flowchart of the processing executed by the command generation filter 206 in a case where the user instructs transmission of the print job in the present embodiment. The processing executed by the command generation filter 206 is actually implemented in such a manner that the CPU 112 reads the program corresponding to the command generation filter 206 from the external storage device 115 and loads the program on the RAM 116 to execute the program.

First, the command generation filter 206 receives, at S601, the spool data (the print data) from the spooler 203. Note that in this state, the command generation filter 206 does not receive the entire print data simultaneously, but acquires a portion of the print data.

Subsequently, the command generation filter 206 determines, at S602, whether or not connection between the information processing device 110 and the communication device 120 for transmission of the print job is connection via the USB. The command generation filter 206 proceeds to S603 in a case where it is determined as being in connection via the USB, and proceeds to S605 in a case where it is determined as not being in connection via the USB. The phrase of "not being in connection via the USB" indicates, for example, connection via a wired LAN or a wireless LAN. Note that such determination is specifically performed with reference to the name of a communication port utilized for transmission of the print job. The command generation filter 206 determines, for example, as being in connection via the USB in a case where the communication port is a USB port, and determines as not being in connection via the USB in a case where the communication port is a web service on devices (WSD) port or a TCP/IP port. As described above, in the present embodiment, the processing is switched according to a connection form. Specifically, the information processing device 110 acquires the exclusive object in the case of being in connection via the USB, and does not acquire the exclusive object in the case of not being in connection via the USB. This is because there is a form in which the exclusive control on communication without connection via the USB is executed on a communication device 120 side, for example. That is, this is because in this form, it is not necessary to execute, on an information processing device 110 side, the exclusive control on communication without connection via the USB.

At S603, the command generation filter 206 determines whether or not the bi-directional communication function is valid. Note that determination on whether or not the bi-directional communication function is valid is specifically performed by checking of the settings for the bi-directional communication function. Note that the form without the language monitor 208, such as the V4 driver, is taken as that in the invalid state of the bi-directional communication function. Moreover, the command generation filter 206 in the V4 driver may execute S604 without the processing of S603. The command generation filter 206 proceeds to S605 in a case where it is determined that the bi-directional communication function is valid, and proceeds to S604 in a case where it is determined that the bi-directional communication function is not valid. Detailed description of S604 will be described later with reference to FIG. 7. Note that in a case where the command generation filter 206 determines that the bi-directional communication function is valid, the exclusive object is acquired by the language monitor 208 as in description of FIG. 3.

At S605, the command generation filter 206 converts the spool data (the print data) received from the spooler 203 into the print job.

Then, the command generation filter 206 outputs, at S606, the print job generated at S605 to a predetermined storage area managed by the OS. Note that the print job output to the predetermined storage area by the command generation filter 206 is sequentially transferred to the language monitor 208 and the USB port monitor 209 by the spooler 203. Specifically, the print job is input to the USB port monitor 209 together with the function for transmitting the data to the communication device 120 via the USB port monitor 209, for example.

Subsequently, the command generation filter 206 determines, at S607, whether or not conversion processing has been completed. Specifically, the command generation filter 206 determines whether or not the entire spool data targeted for conversion has been converted into the print job. In a case where it is determined that the entire spool data targeted for conversion has not been converted into the print job yet, the command generation filter 206 returns to S601 to receive the remaining portion of the spool data. Note that after having returned to S601, the command generation filter 206 may perform the processing of S605 without the processing of S602.

At S607, in a case where it is determined that the entire spool data has been converted into the print job, the command generation filter 206 terminates the print job generation processing.

Figure 7:
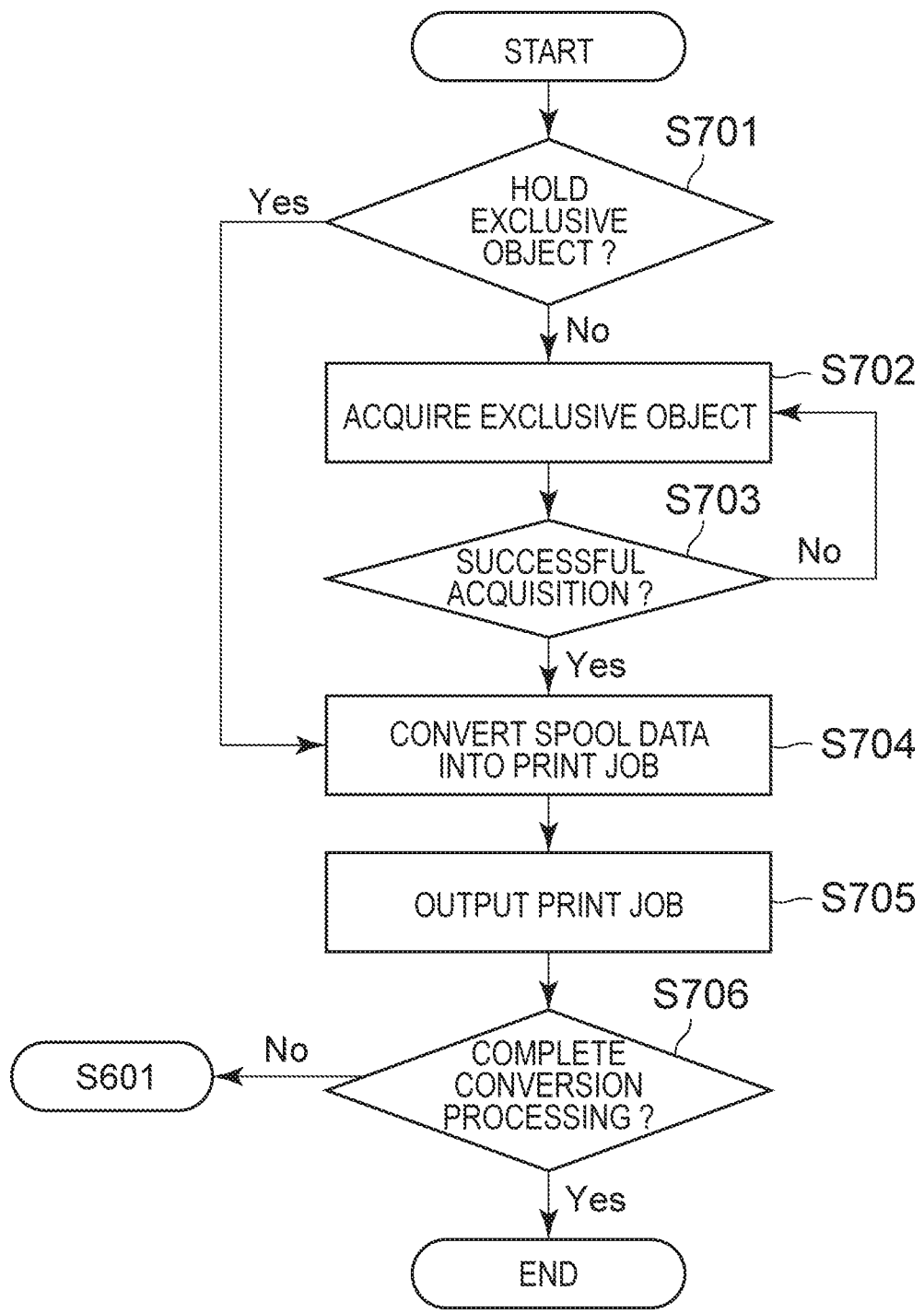
FIG. 7 is a flowchart of the details of print job generation processing executed by the command generation filter in a first embodiment.

FIG. 7 is a flowchart of the details of the print job generation processing of S604 executed by the command generation filter 206 in the present embodiment. The processing executed by the command generation filter 206 is actually implemented in such a manner that the CPU 112 reads the program corresponding to the command generation filter 206 from the external storage device 115 and loads the program on the RAM 116 to execute the program.

First, the command generation filter 206 determines, at S701, whether or not the exclusive object associated with the USB port monitor 209 utilized for transmission of the print job is held. The command generation filter 206 proceeds to S702 in a case where it is determined that the exclusive object is not held, and proceeds to S704 in a case where it is determined that the exclusive object is held.

At S702, the command generation filter 206 attempts to acquire the exclusive object associated with the USB port monitor 209 utilized for transmission of the print job. Note that in a state in which this exclusive object is held by software other than the command generation filter 206, such as the USB communication application 210, the command generation filter 206 cannot acquire the exclusive object. That is, in this state, the exclusive object acquiring processing is failed. In a case where the exclusive object acquiring processing is successfully performed, the command generation filter 206 acquires the exclusive object.

Next, the command generation filter 206 determines, at S703, whether or not the exclusive object acquiring processing of S702 has been successfully performed. In a case where it is determined that the exclusive object acquiring processing has been successfully performed, the command generation filter 206 proceeds to S704. On the other hand, in a case where it is determined that the exclusive object acquiring processing has not been successfully performed (i.e., failed), the command generation filter 206 executes the processing of S702 again, and repeats such processing until the exclusive object acquiring processing is successfully performed. That is, the command generation filter 206 repeats the processing until the software other than the command generation filter 206 deletes the exclusive object so that the exclusive object can be newly acquired. Note that in this state, the command generation filter 206 may proceed to S704 in a case where the number of repetitions of the processing exceeds a predetermined number. Alternatively, the command generation filter 206 may proceed to S704 in a case where the time spent for repetition of the processing exceeds a predetermined time (i.e., a state in which the exclusive object is not held by the command generation filter 206 continues for the predetermined time or longer). As another alternative, the command generation filter 206 may determine, for example, whether or not the software other than the command generation filter 206 holds the exclusive object, and may proceed to S704 in a case where it is determined that the exclusive object is not held. As still another alternative, the command generation filter 206 may terminate the processing without transmission of the print job, for example. Moreover, in this state, the command generation filter 206 may display a screen for providing notification of an error on the output device 118.

At S704, the command generation filter 206 converts the spool data (the print data) received from the spooler 203 into the print job.

Then, the command generation filter 206 outputs, at S705, the print job generated at S704 to a predetermined storage area managed by the OS. Note that the print job output to the predetermined storage area by the command generation filter 206 is sequentially transferred to the USB port monitor 209 by the spooler 203. Specifically, the print job is input to the USB port monitor 209 together with the function for transmitting the data to the communication device 120 via the USB port monitor 209.

Subsequently, the command generation filter 206 determines, at S706, whether or not the conversion processing has been completed. Specifically, the command generation filter 206 determines whether or not the entire spool data targeted for conversion has been converted into the print job. In a case where it is determined that the entire spool data targeted for conversion has not been converted into the print job yet, the command generation filter 206 returns to S601 to convert the remaining portion of the spool data into the print job. Note that after having returned to S601, the command generation filter 206 may perform the processing of S604 without the processing of S602 and S603. On the other hand, in a case where it is determined that the entire spool data targeted for conversion has been converted into the print job, the command generation filter 206 terminates the processing.

Figure 8:
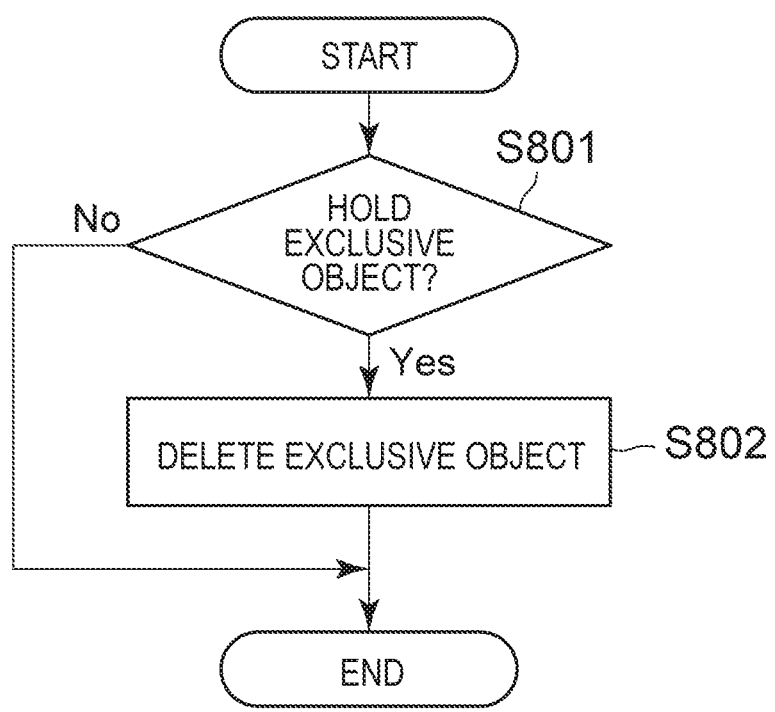
FIG. 8 is a flowchart of termination processing executed by the command generation filter.

FIG. 8 is a flowchart of termination processing executed by the command generation filter 206 in the present embodiment. The termination processing is processing executed by the command generation filter 206 for deleting the exclusive object. Note that the command generation filter 206 may execute the termination processing at optional timing after the entire print job targeted for transmission has been transmitted to the communication device 120. For example, the command generation filter 206 may execute the termination processing right after the entire print job targeted for transmission has been transmitted to the communication device 120.

Among printer drivers included in information processing devices 110, there is a printer driver configured so that job holding processing can be executed, for example. The job holding processing is the processing of continuously holding the job at the job cue until the processing of the job transmitted to the communication device 120 is terminated by the communication device 120. The printer driver has the function of receiving and acquiring (receiving information), as necessary, information on the state of the job held in the job cue. Thus, the printer driver can execute the job holding processing to recognize the state of the job until the job is deleted from the job cue, and can notify the user of the information on the state of the job. Note that the printer driver specifically causes the USB port monitor to acquire the information on the state of the job, thereby recognizing the state of the job. That is, the information on the state of the job is acquired via USB communication. As described above, when communication is performed by multiple applications by means of the same path, a situation such as mixing of information is caused. For this reason, the exclusive control is also performed when the information on the state of the job is acquired by the printer driver. Thus, in a case where the processing of the job transmitted to the communication device 120 is terminated by the communication device 120, the command generation filter 206 may execute the termination processing, for example.

Note that the processing executed by the command generation filter 206 is actually implemented in such a manner that the CPU 112 reads the program corresponding to the command generation filter 206 from the external storage device 115 and loads the program on the RAM 116 to execute the program.

First, the command generation filter 206 determines, at S801, whether or not the exclusive object is held. The command generation filter 206 proceeds to S802 in a case where it is determined that the exclusive object is held, and terminates the processing in a case where it is determined that the exclusive object is not held.

The command generation filter 206 deletes, at S802, the held exclusive object, and transitions from the state of holding the exclusive object to the state of not holding the exclusive object. Then, the command generation filter 206 terminates the processing.

With this form, the exclusive control in communication can be properly executed even under a situation where the language monitor 208 is not provided or does not operate (i.e., invalidated). Moreover, even in a case where transmission of the print job is, for example, canceled under a situation where the exclusive object cannot be acquired, useless generation of the print job can be reduced.

Second Embodiment

Typically, a form has been known, in which an information processing device (a client) having a command generation filter 206 transmits a print job to a communication device 120 via an information processing device (a server) connected to the client via a network. Communication environment in this form is called "server/client environment". In the server/client environment, the server has a USB communication application 210, and the server and the communication device 120 are connected via a USB, for example. In this form, in a case where transmission of the print job from the server to the communication device 120 and communication with the communication device 120 by the USB communication application 210 operating at the server are executed in parallel on the same communication path, mixing of communicated data might be caused, for example. For this reason, exclusive control is to be also executed for USB communication between the server and the communication device 120. However, in a form in which the client as a print job generation source acquires an exclusive object, the exclusive control between the server and the communication device 120 cannot be executed. For this reason, in the present embodiment, the form of performing control for properly executing the exclusive control between the server and the communication device 120 in the server/client environment will be described.

Figure 9:
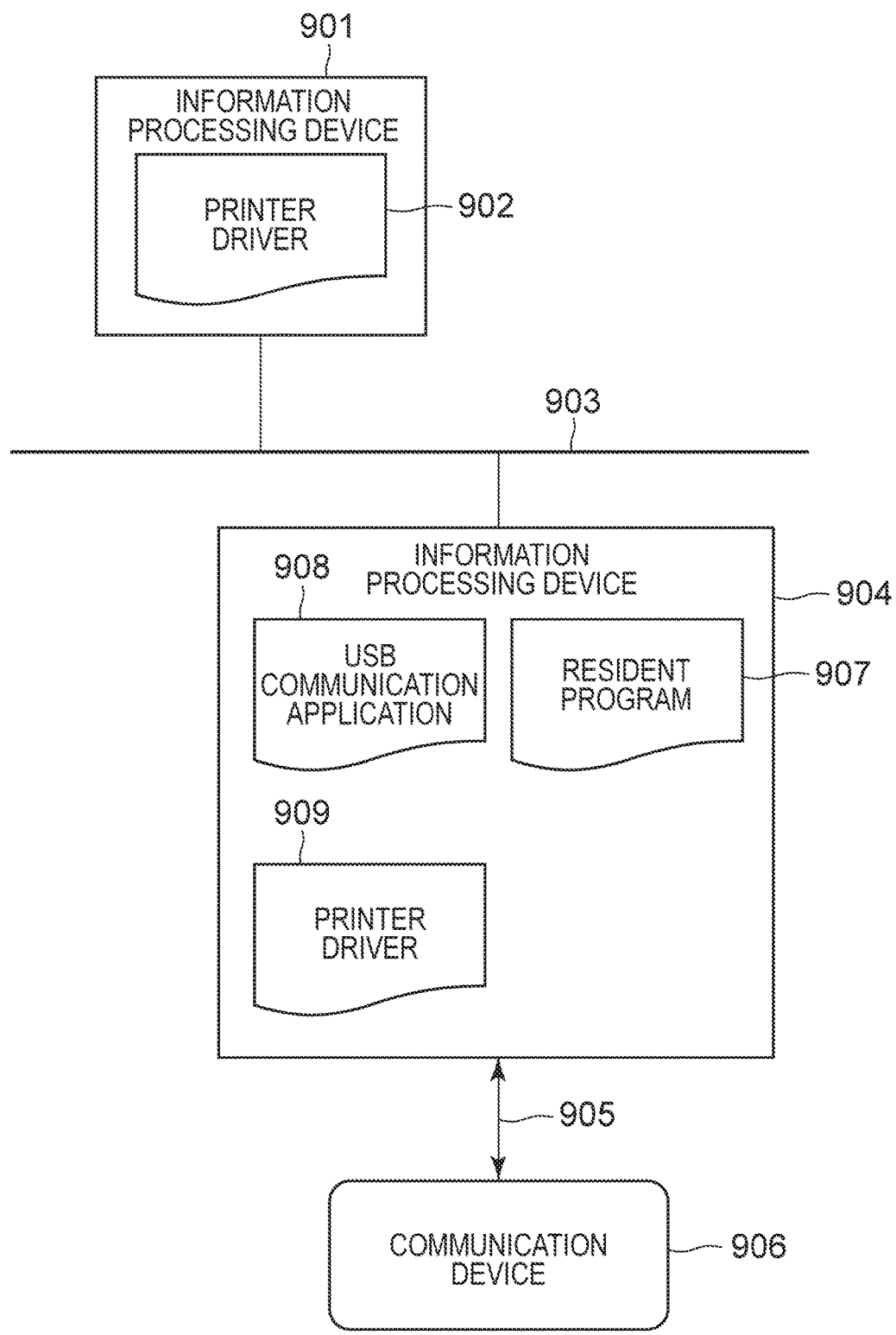
FIG. 9 is a block diagram of a print system forming server/client environment.

FIG. 9 illustrates a communication system of the present embodiment. The communication system of the present embodiment forms the server/client environment. In the present embodiment, an information processing device 901 operates as the client, and an information processing device 904 operates as the server. Note that configurations of the information processing device 901 and the information processing device 904 are similar to those of the information processing device 110 described in the first embodiment.

The information processing device 901 and the information processing device 904 are connected together via a network I/F 903. Note that a communication method for the network I/F 903 is not specifically limited, and therefore, the network I/F 903 may be wired or wireless. Moreover, a communication device 906 and the information processing device 904 are connected together via a USB I/F 905. The USB I/F 905 is an interface for communication by a USB communication method. That is, communication between the communication device 906 and the information processing device 904 is performed by the USB communication method.

In the present embodiment, the information processing device 901 has a printer driver 902. The printer driver 902 has a configuration similar to that of the V4 driver described in the first embodiment. Note that the information processing device 901 may have a USB communication application and a later-described resident program for executing USB communication in local environment. The information processing device 904 has a printer driver 909, a USB communication application 908, and a resident program 907. In the present embodiment, the printer driver included in the information processing device 904 is similar to that included in the information processing device 901. Moreover, the USB communication application 908 is similar to that described in the first embodiment. The information processing device 904 operates as the server, and therefore, the printer driver 909, the USB communication application 908, and the resident program 907 are server-side programs.

In the present embodiment, a print job generated by a command generation filter 206 of the printer driver 902 is transmitted to the information processing device 904 via the network I/F 903. Then, the information processing device 904 having received the print job from the information processing device 901 stores the received print job in a spooler 203 of the printer driver 909. Then, the information processing device 904 transmits the received print job to the communication device 906 via a USB port monitor 209 of the information processing device 904 and the USB I/F 905. Note that the processing for conversion into the print job has been already completed on an information processing device 901 side, and therefore, the print job is transmitted without a command generation filter 206 of the printer driver 909.

The resident program 907 is a program for starting operation at the same time as activation (power-ON) of the information processing device 904 and terminating operation by termination (power-OFF) of the information processing device 904 or user operation. The resident program 907 is installed on the information processing device 904 together with the printer driver 909 when the printer driver 909 is installed on the information processing device 904. That is, the resident program 907 is a program provided by the same vendor as that of the printer driver 909, the program corresponding to the printer driver 909. The resident program 907 can perform optional processing according to a remote operation instruction from an optional information processing device connected to the information processing device 904 via the network I/F 903. For example, in the case of starting transmission of the print job, the resident program 907 activates a status monitor as a module for acquiring information on the job. Moreover, the resident program 907 operates at the information processing device 904 operating as the server, and therefore, is taken as a server-side program.

FIG. 6 is a flowchart of processing executed by the command generation filter 206 of the printer driver 902 in a case where a user instructs transmission of the print job in the present embodiment. That is, the processing described below is processing executed on a client side. The processing executed by the command generation filter 206 is actually implemented in such a manner that a CPU 112 reads the program corresponding to the command generation filter 206 from an external storage device 115 and loads the program on a RAM 116 to execute the program.

The processing of S601, S603, and S605 to S607 is similar to that described in the first embodiment, and therefore, description thereof will not be repeated.

At S602, the command generation filter 206 determines whether or not connection between the information processing device 904 (the server) and the communication device 120 for transmission of the print job is connection via the USB. For such determination, the command generation filter 206 may inquire the information processing device 904 of a connection form between the information processing device 904 and the communication device 120. The command generation filter 206 proceeds to S603 in a case where it is determined as being in connection via the USB, and proceeds to S605 in a case where it is determined as not being in connection via the USB. Determination details are similar to the contents described in the first embodiment.

The details of the processing of S604 in the present embodiment will be described later with reference to FIG. 10.

As described above, in the present embodiment, the processing is switched according to the connection form between the server and the communication device 120.

Figure 10:
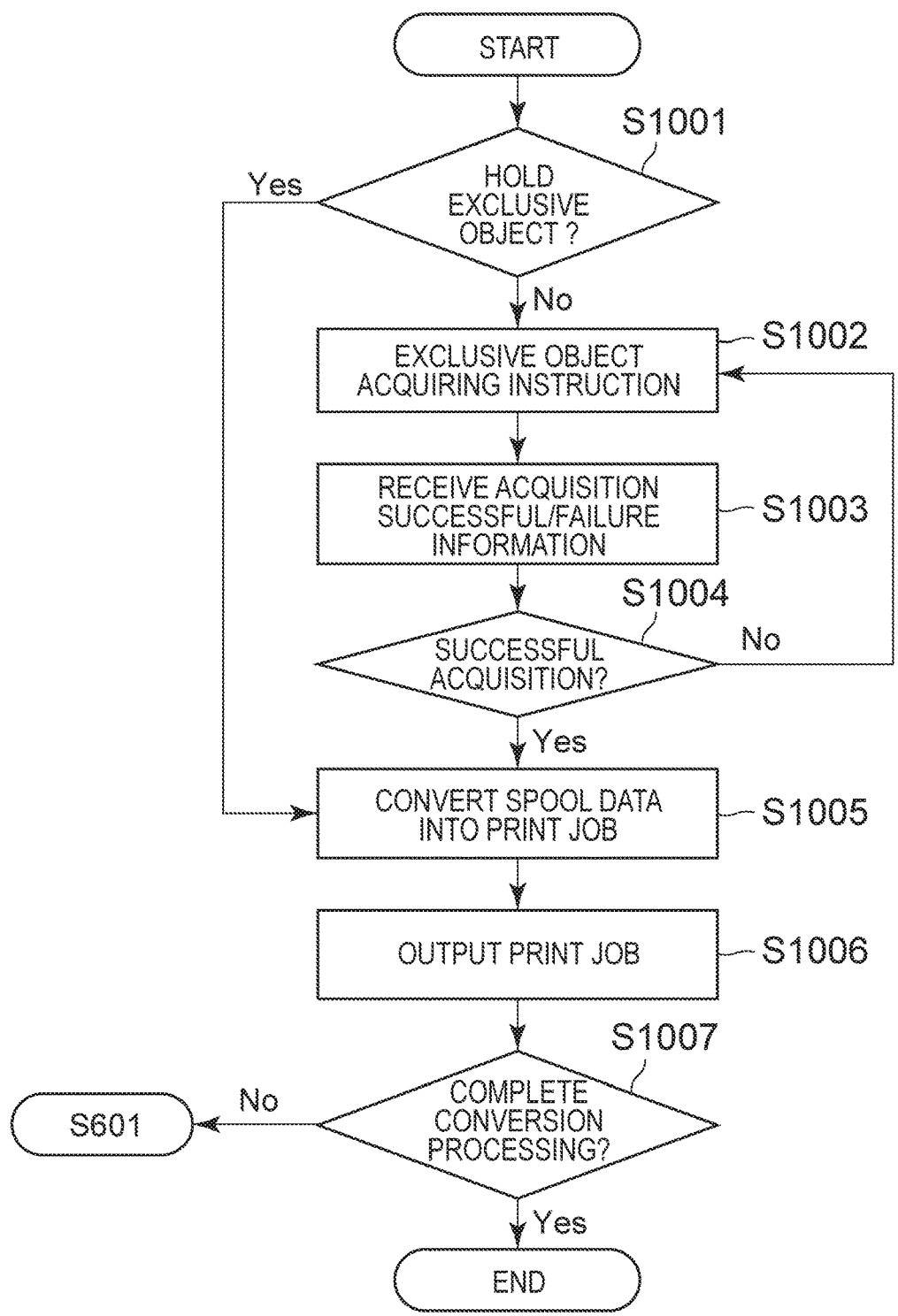
FIG. 10 is a flowchart of the details of print job generation processing executed by a command generation filter in a second embodiment.

FIG. 10 is a flowchart of the details of print job generation processing of S604 executed by the command generation filter 206 of the printer driver 902 in the present embodiment. The processing executed by the command generation filter 206 is actually implemented in such a manner that the CPU 112 reads the program corresponding to the command generation filter 206 from the external storage device 115 and loads the program on the RAM 116 to execute the program. Moreover, the processing executed by the resident program 907 is actually implemented in such a manner that the CPU 112 reads the program corresponding to the resident program 907 from the external storage device 115 and loads the program on the RAM 116 to execute the program. Note that the CPU 112, the external storage device 115, and the RAM 116 as described above are configurations included in the information processing device 901.

First, the command generation filter 206 determines, at S1001, whether or not an exclusive object associated with the USB port monitor 209 utilized for transmission of the print job is held by the resident program 907 of the information processing device 904. Specifically, such determination is performed with reference to acquisition successful/failure information acquired at S1003 described later. In a case where the acquisition successful/failure information indicates successful acquisition of the exclusive object, the command generation filter 206 determines that the resident program 907 holds the exclusive object. In a case where the acquisition successful/failure information indicates failed acquisition of the exclusive object, the command generation filter 206 determines that the resident program 907 does not hold the exclusive object. Thus, at such a stage that the processing of S1003 has not been executed yet, the processing of S1002 may be executed without the processing of S1001. Note that in a case where the acquisition successful/failure information indicating successful/failed acquisition of the exclusive object is, for example, the exclusive object itself, the command generation filter 206 may determine, at S1001, whether or not the exclusive object is held by the command generation filter 206. The command generation filter 206 proceeds to S1002 in a case where it is determined that the exclusive object is not held, and proceeds to S1005 in a case where it is determined that the exclusive object is held.

Next, the command generation filter 206 instructs, at S1002, the resident program 907 as the server-side program to acquire the exclusive object associated with the USB port monitor 209 operating at the information processing device 904 and utilized for transmission of the print job. That is, the command generation filter 206 transmits, as the remote operation instruction, an exclusive object acquiring instruction to the resident program 907. Note that in this state, not the printer driver 909 but the resident program 907 is instructed because there is a probability that no instruction is sent to the printer driver 909 due to the printer driver 909 not operating upon instruction. As described above, the resident program 907 starts operation at the same time as activation of the information processing device 904, and therefore, is highly likely to receive the instruction.

Note that the command generation filter 206 may transmit the instruction to the printer driver 909 in a case where the printer driver 909 is in operation. In this case, the exclusive control is implemented in such a manner that the module of the printer driver 909 acquires, in description below, the exclusive object instead of the resident program 907.

In the case of acquiring/holding the exclusive object by the resident program 907, communication with the communication device 120 by other programs (the USB communication application 908 etc.) for the exclusive control than the resident program 907 among the programs included in the information processing device 904 is not performed. In the case of deleting the exclusive object by the resident program 907, USB communication with the communication device 120 by other programs than the resident program 907 having held the exclusive object among the programs included in the information processing device 904 becomes executable.

Subsequently, the command generation filter 206 receives, at S1003, the acquisition successful/failure information from the information processing device 904, the acquisition successful/failure information indicating whether or not the exclusive object is successfully acquired by the resident program 907. Note that the acquisition successful/failure information may be, for example, the acquired exclusive object itself or other types of information such as a flag indicating successful/failed acquisition.

Then, the command generation filter 206 determines, at S1004, whether or not the received acquisition successful/failure information indicates successful acquisition of the exclusive object. In other words, the command generation filter 206 determines whether or not the exclusive object has been successfully acquired by the resident program 907. The command generation filter 206 proceeds to S1005 in a case where it is determined that the exclusive object has been successfully acquired by the resident program 907. On the other hand, in a case where it is determined that exclusive object acquisition by the resident program 907 has not been successful (i.e., failed), the command generation filter 206 executes the processing of S1002 again, and repeats the processing until the exclusive object is successfully acquired by the resident program 907. Note that in this state, the command generation filter 206 may proceed to S1005 in a case where the number of repetitions of the processing exceeds a predetermined number. Alternatively, the command generation filter 206 may proceed to S1005 in a case where the time spent for repetition of the processing exceeds a predetermined time (a state in which the exclusive object is not held by the command generation filter 206 continues for the predetermined time or longer). As another alternative, the command generation filter 206 may determine, for example, whether or not software of the information processing device 904 other than the resident program 907 holds the exclusive object, and may proceed to S1005 in a case where it is determined that the exclusive object is not held. As still another alternative, the command generation filter 206 may terminate, for example, the processing without transmission of the print job. Moreover, in this state, the command generation filter 206 may display a screen for providing notification of an error on an output device 118.

When the exclusive object is successfully acquired by the resident program 907, other types of software operating at the information processing device 904, such as the USB communication application 908, do not execute communication via the USB port monitor 209 utilized for transmission of the print job. Note that as described above, the processing of transmitting the print job received from the information processing device 901 is performed without the command generation filter 206 of the printer driver 909. That is, this transmission processing is performed without the module having the function of stopping communication in a case where the exclusive object is not held. Thus, the printer driver 909 can perform the transmission processing even when the resident program 907 holds the exclusive object. Consequently, the information processing device 904 can transmit the print job without, e.g., occurrence of data mixing.

At S1005, the command generation filter 206 converts spool data (print data) received from the spooler 203 into the print job.

Then, the command generation filter 206 outputs, at S1006, the print job generated at S1005 to a predetermined storage area managed by an OS. Note that the print job output to the predetermined storage area by the command generation filter 206 is sequentially transferred to the information processing device 904 by the spooler 203.

Subsequently, the command generation filter 206 determines, at S1007, whether or not the entire spool data targeted for conversion has been converted into the print job. In a case where it is determined that the entire spool data targeted for conversion has not been converted into the print job yet, the command generation filter 206 returns to S601 to convert the remaining portion of the spool data into the print job. On the other hand, in a case where it is determined that the entire spool data targeted for conversion has been converted into the print job, the command generation filter 206 terminates the processing.

Figure 11:
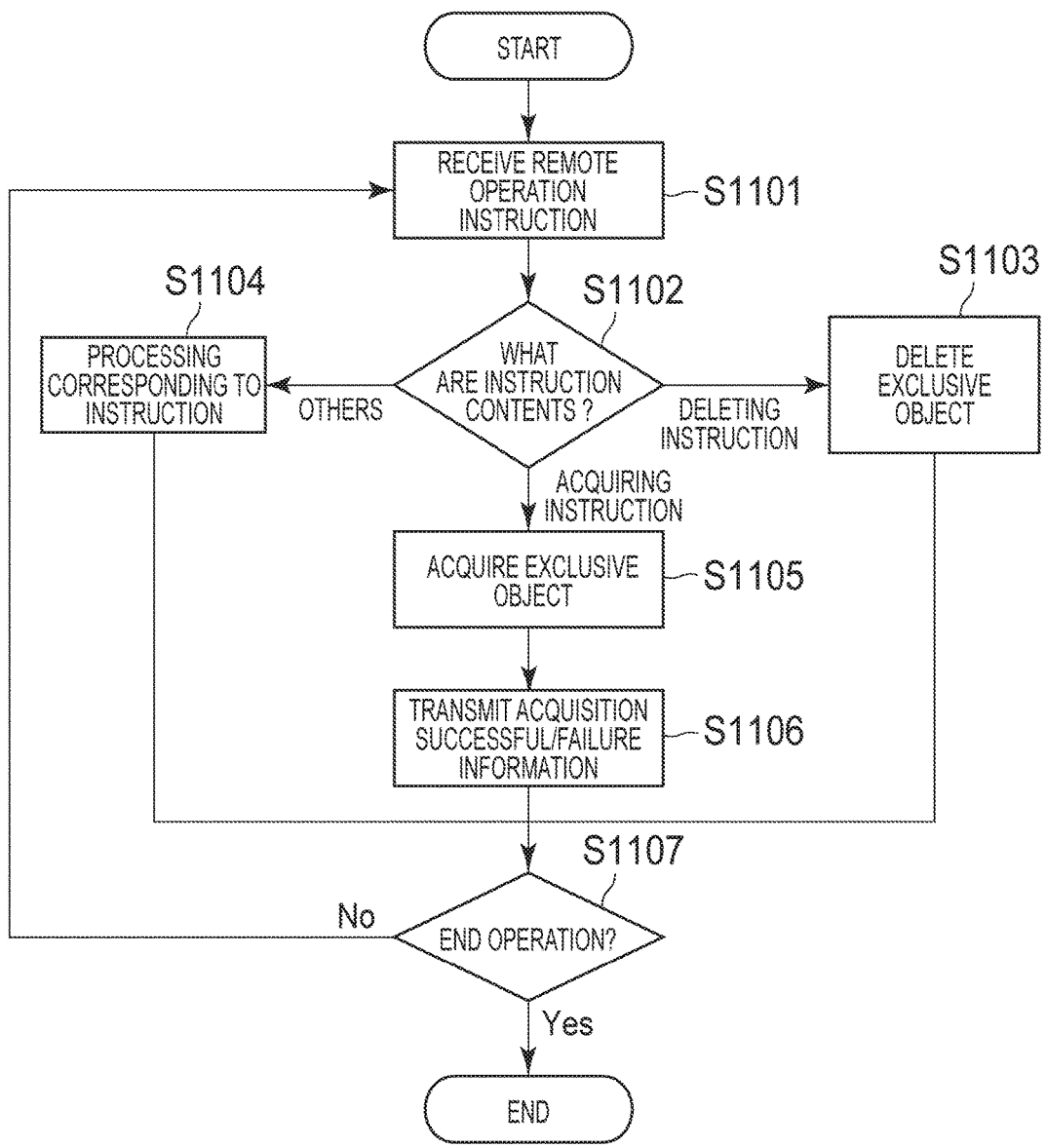
FIG. 11 is a flowchart of processing of a resident program.

FIG. 11 is a flowchart of the processing executed by the resident program 907 operating on the information processing device 904 in the present embodiment. That is, the processing described below is processing performed on a server side. The processing executed by the resident program 907 is actually implemented in such a manner that the CPU 112 reads the program corresponding to the resident program 907 from the external storage device 115 and loads the program on the RAM 116 to execute the program. Note that the CPU 112, the external storage device 115, and the RAM 116 as described above are configurations included in the information processing device 904.

First, the resident program 907 receives, at S1101, the remote operation instruction from the client (the information processing device 901 etc.) connected to the information processing device 904 via the network I/F 903.

Subsequently, the resident program 907 determines, at S1102, the contents of the remote operation instruction received at S1101. The resident program 907 proceeds to S1105 in a case where it is determined that the contents of the remote operation instruction are the exclusive object acquiring instruction. The resident program 907 proceeds to S1103 in a case where it is determined that the contents of the remote operation instruction are an exclusive object deleting instruction. The exclusive object deleting instruction is an instruction transmitted upon termination instruction executed by the command generation filter 206, and will be described later in detail. The resident program 907 proceeds to S1104 in a case where it is determined that the contents of the remote operation instruction are neither the exclusive object deleting instruction nor the exclusive object acquiring instruction, i.e., other instructions.

At S1103, the resident program 907 deletes the held exclusive object. Subsequently, the resident program 907 proceeds to S1107.

At S1104, the resident program 907 executes the processing according to the remote operation instruction (other instructions) received at S1101. Subsequently, the resident program 907 proceeds to S1107.

At S1105, the resident program 907 attempts to acquire the exclusive object associated with the USB port monitor 209 operating at the information processing device 904 and utilized for transmission of the print job. Note that in a state in which this exclusive object is, for example, held by software other than the resident program 907, such as the USB communication application 908, the resident program 907 cannot acquire the exclusive object. That is, in this state, exclusive object acquiring processing is failed. In a case where the exclusive object acquiring processing is successfully performed, the resident program 907 acquires the exclusive object.

Next, the resident program 907 transmits, at S1106, the acquisition successful/failure information to the information processing device as a transmission source of the remote operation instruction received at S1101. Specifically, in a case where the exclusive object acquiring processing is successfully performed, the resident program 907 transmits the acquisition successful/failure information indicating the successful exclusive object acquiring processing. On the other hand, in a case where the exclusive object acquiring processing is failed, the resident program 907 transmits the acquisition successful/failure information indicating the failed exclusive object acquiring processing.

Next, the resident program 907 determines, at S1107, whether or not operation is to be terminated. In a case where operation of the information processing device 904 has terminated (a power source is turned OFF) or a termination notification is issued for the resident program 907 by the user operation, the resident program 907 determines that operation is to be terminated. In a case where it is determined that operation is to be terminated, the resident program 907 terminates the entire processing. In a case where it is determined that operation is not to be terminated, the resident program 907 returns to S1101 to wait for reception of a new remote operation instruction.

FIG. 8 is a flowchart of termination processing executed by the command generation filter 206 of the information processing device 901 in the present embodiment. That is, the processing described below is processing executed on the client side. The command generation filter 206 may execute the termination processing at optional timing. For example, the command generation filter 206 may execute the termination processing in a case where the entire print job targeted for transmission is transmitted to the communication device 120. For example, in such a form that job holding processing is executable, the termination processing may be executed in a case where the processing of the job transmitted to the communication device 120 is terminated by the communication device 120.

Note that the processing executed by the command generation filter 206 is actually implemented in such a manner that the CPU 112 reads the program corresponding to the command generation filter 206 from the external storage device 115 and loads the program on the RAM 116 to execute the program. Note that the CPU 112, the external storage device 115, and the RAM 116 as described above are the configurations of the information processing device 901.

First, the command generation filter 206 determines, at S801, whether or not the resident program 907 holds the exclusive object. The command generation filter 206 proceeds to S802 in a case where it is determined that the resident program 907 holds the exclusive object, and terminates the processing in a case where it is determined that the resident program 907 does not hold the exclusive object.

At S802, the command generation filter 206 transmits, as the remote operation instruction, the instruction (the exclusive object deleting instruction) for deleting the exclusive object held by the resident program 907. Thus, the resident program 907 transitions from the state of holding the exclusive object to the state of not holding the exclusive object. Subsequently, the processing is terminated.

As described above, in the present embodiment, when transmitting the print job to the communication device via the information processing device operating as the server, the information processing device operating as the client transmits the exclusive object acquiring instruction to the information processing device operating as the server. Then, the information processing device operating as the server receives the instruction, and therefore, the resident program operating at the information processing device operating as the server acquires the exclusive object. With this form, the exclusive control can be implemented even in the server/client environment, and the situation such as occurrence of data mixing can be reduced.

Third Embodiment

The environment where the print job can be transmitted to the communication device 120 without the server as described in the first embodiment is called "local environment". For example, there is an information processing device operable in both of server/client environment and the local environment. In the present embodiment, a form will be described, in which such an information processing device 110 executes exclusive control suitable for the environment to which the information processing device 110 itself belongs.

In the present embodiment, the information processing device 110 has a printer driver configured similarly to the V4 driver described in the first embodiment.

Figure 12:
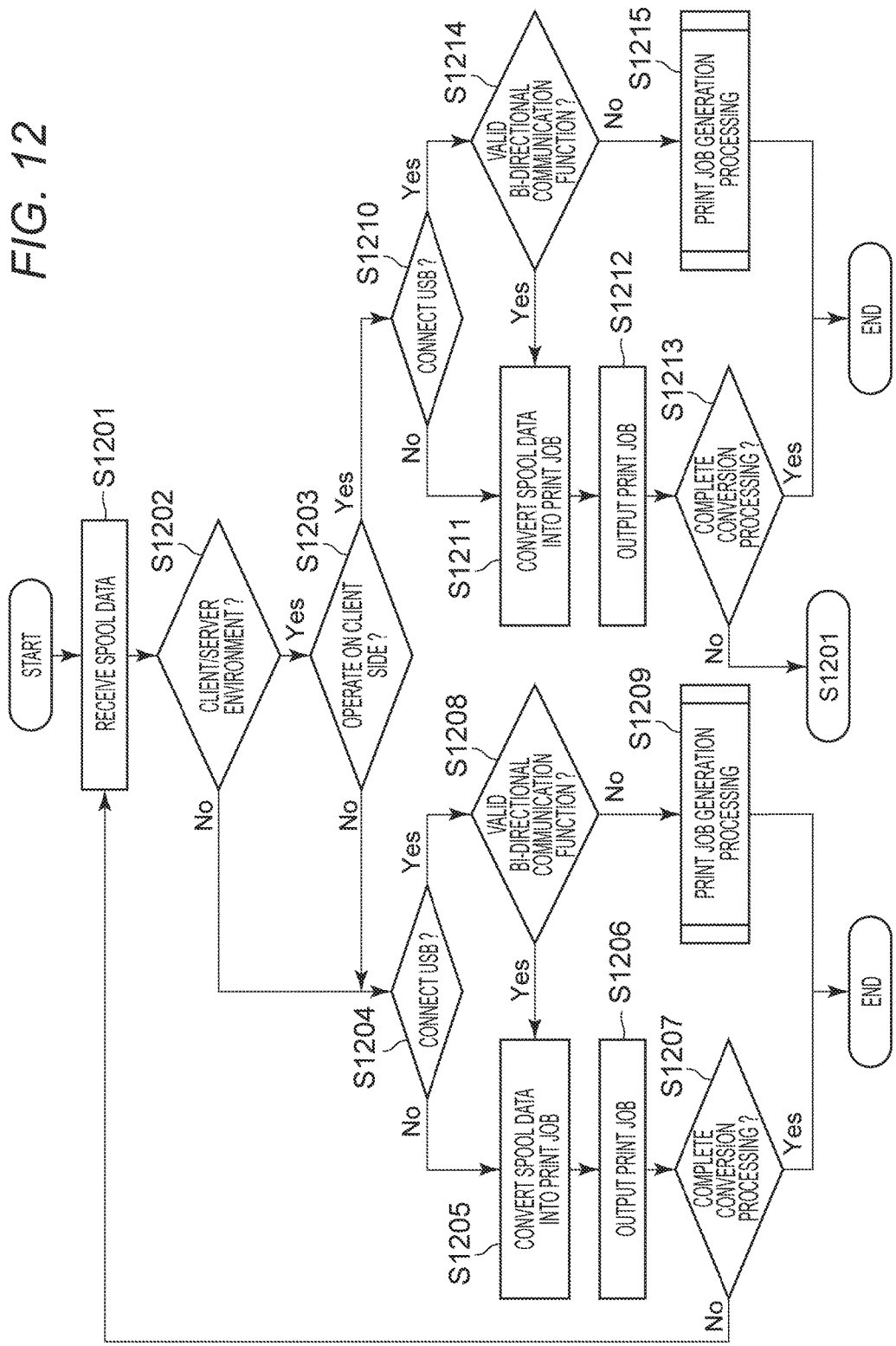
FIG. 12 is a flowchart of the details of print job generation processing executed by a command generation filter in a third embodiment.

FIG. 12 is a flowchart of processing executed by a command generation filter 206 of the information processing device 110 generating a print job based on a print job transmission instruction in a case where the instruction is made by a user in the present embodiment. The processing executed by the command generation filter 206 is actually implemented in such a manner that a CPU 112 reads the program corresponding to the command generation filter 206 from an external storage device 115 and loads the program on a RAM 116 to execute the program.

The processing of S1201 is similar to that of S601 described in the first embodiment, and therefore, description thereof will not be repeated.

At S1202, the command generation filter 206 determines whether or not print environment for the information processing device 110 is the server/client environment. Specifically, the command generation filter 206 inquires, in this state, an OS of the name of a print device (in this case, a communication device 120) corresponding to the printer driver of the information processing device 110. In this state, the OS does not respond to such an inquiry when the print environment for the information processing device 110 is the local environment. Thus, in a case where the OS does not respond to the inquiry, the command generation filter 206 determines that the print environment for the information processing device 110 is not the server/client environment (i.e., is the local environment), and proceeds to S1204. On the other hand, when the print environment for the information processing device 110 is the server/client environment, the OS responds to the inquiry to notify the command generation filter 206 of information. Specifically, the OS transmits, to the command generation filter 206, the information on the name of the print device corresponding to the printer driver of the information processing device 110 and the name of a device directly connected (without a server) to the print device. Thus, in a case where the OS responds to the inquiry, the command generation filter 206 determines that the print environment for the information processing device 110 is the server/client environment, and proceeds to S1203.

At S1203, the command generation filter 206 determines whether or not the information processing device 110 operates as a client in the server/client environment. Specifically, the command generation filter 206 refers to, in this state, the information acquired from the OS as a respond to the inquiry. In a case where the name of the device directly connected to the print device is the name of the information processing device 110, the command generation filter 206 determines that the information processing device 110 does not operate as the client (i.e., operates as the server), and proceeds to S1204. In a case where the information processing device 110 receiving a print job transmission instruction from a user and generating the print job based on the instruction operates as the server, communication between the information processing device 110 and the communication device 120 is performed without other devices. That is, communication substantially similar to that in the local environment is performed even in the server/client environment, and therefore, the command generation filter 206 performs, after S1203, processing similar to that in the case of the local environment.

In a case where the name of the device directly connected to the print device is not the name of the information processing device 110, the command generation filter 206 determines that the information processing device 110 operates as the client, and proceeds to S1210.

The processing of S1204 to S1209 is similar to that of S601 to S607 described in the first embodiment. That is, in a case where the print environment for the information processing device 110 is the local environment or a case where the print environment for the information processing device 110 is the server/client environment and the information processing device 110 operates as the sever, the information processing device 110 acquires an exclusive object as necessary.

Moreover, the processing of S1210 to S1215 is similar to that of S601 to S607 described in the second embodiment. That is, in a case where the print environment for the information processing device 110 is the server/client environment and the information processing device 110 operates as the client, the server connected to the information processing device 110 acquires the exclusive object as necessary.

With this form, the information processing device 110 can properly execute exclusive control according to the print environment for the information processing device 110 itself.

Other Embodiments

The example has been described above, in which the form in which acquisition of the exclusive object is executed by the command generation filter before the print job is generated is applied to the information processing device 110 having the V4 driver. However, the aspect of the embodiments is not limited to this form. A form in which acquisition of the exclusive object is executed by the command generation filter before the print job is generated may be applied to the information processing device 110 having other drivers than the V4 driver, such as the V3 driver.

The disclosure can be implemented by such a processing that a program for implementing one or more functions of the above-described embodiments is supplied to a system or a device via a network or various storage media and a computer (a CPU, a MPU, etc.) of the system or the device reads and executes the program. Moreover, the program may be executed by a single computer or by cooperation of multiple computers. Further, the entire processing described above is not necessarily implemented by the software, and part or entirety of the processing may be implemented by hardware such as an ASIC. In addition, the aspect of the embodiments is not limited to the form in which the entire processing is performed by a single CPU, and a form in which multiple CPUs cooperate, as necessary, with each other to perform the processing may be employed. Moreover, a form may be employed, in which any portion of the above-described processing may be executed by a single CPU and other portions of the processing are executed by cooperation of multiple CPUs.

According to the aspect of the embodiments, more proper exclusive control can be executed.

Embodiment(s) of the disclosure can also be implemented by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2017-016203, filed Jan. 31, 2017, which is hereby incorporated by reference herein in its entirety.

What is claimed is:

1. A method for controlling an information processing device having a predetermined program for generating a job for causing a communication device to execute image processing and at least one other program other than the predetermined program, comprising:
    executing, by means of the predetermined program, acquiring processing for acquiring an exclusive object before the job is generated; and generating the job by means of the predetermined program in a state in which the exclusive object acquired by means of the predetermined program is held, wherein the job is not generated by means of the predetermined program in a state in which the exclusive object is not acquired by means of the predetermined program, wherein the generated job is transmitted to the communication device in a state in which the exclusive object acquired by means of the predetermined program is held, in a state in which the exclusive object acquired by means of the predetermined program is not held, communication with the communication device based on the at least one other program is executable, and in a state in which the exclusive object acquired by means of the predetermined program is held, communication with the communication device based on the at least one other program is not performed, and in a case where the exclusive object acquired by means of the at least one other program is held, the exclusive object is not acquired by means of the predetermined program, and in a case where the exclusive object acquired by means of the at least one other program is not held, the exclusive object is acquired by means of the predetermined program.

2. The control method according to claim 1, wherein in a case where a state in which the exclusive object is not acquired by means of the predetermined program continues for a predetermined time or longer after the acquiring processing has been executed by means of the predetermined program, the job is generated by means of the predetermined program.

3. The control method according to claim 1, further comprising:

deleting, in a case where the generated job has been transmitted to the communication device, the exclusive object held after acquisition by means of the predetermined program, wherein in a case where the exclusive object held after acquisition by means of the predetermined program is deleted, communication with the communication device based on the at least one other program is executable.

4. The control method according to claim 1, further comprising:

receiving, from the communication device, information on the job transmitted to the communication device until processing based on the job transmitted to the communication device is completed by the communication device; and deleting, in a case where the processing based on the job transmitted to the communication device has been completed by the communication device, the exclusive object held after acquisition by means of the predetermined program, wherein in a case where the exclusive object held after acquisition by means of the predetermined program is deleted, communication with the communication device based on the at least one other program is executable.

5. The control method according to claim 1, further comprising:

transmitting, in a case where the job generated by means of the predetermined program is transmitted to the communication device via a server, an instruction to the server before the job is generated, the instruction being for executing the acquiring processing by means of a predetermined server-side program of the server, wherein in a case where the generated job is transmitted to the communication device without the server, the acquiring processing is executed by means of the predetermined program before the job is generated, in a case where the instruction has been received by the server, the acquiring processing is executed by means of the predetermined server-side program, in a case where the generated job is transmitted to the communication device via the server, the generated job in a state in which the exclusive object acquired by means of the predetermined server-side program is held, and the job is not generated by means of the predetermined program in a state in which the exclusive object is not acquired by means of the predetermined server-side program, the generated job is transmitted to the communication device via the server in a state in which the exclusive object acquired by means of the predetermined server-side program is held, and in a state in which the exclusive object acquired by means of the predetermined server-side program is held, communication with the communication device based on at least one program of the server other than the predetermined server-side program is not performed.

6. The control method according to claim 5, wherein in a case where the generated job is transmitted to the communication device via the server, the exclusive object held after acquisition by means of the predetermined server-side program is deleted, and in a case where the exclusive object held after acquisition by means of the predetermined server-side program is deleted, communication with the communication device based on the at least one other program of the server other than the predetermined server-side program is executable.

7. The control method according to claim 5, further comprising:

receiving information from the communication device via the server until processing based on the job transmitted to the communication device is completed by the communication device, the information being information on the job transmitted to the communication device, wherein in a case where the processing based on the job transmitted to the communication device has been completed by the communication device, the exclusive object held after acquisition by means of the predetermined server-side program is deleted, and in a case where the exclusive object held after acquisition by means of the predetermined server-side program is deleted, communication with the communication device based on the at least one other program of the server other than the predetermined server-side program is executable.

8. The control method according to claim 5, wherein the predetermined server-side program is a program corresponding to a printer driver of the server, and the at least one other program of the server other than the predetermined server-side program is a program of the server other than the printer driver.

9. The control method according to claim 1, wherein the generated job is a print job for causing the communication device to execute print processing for using a recording material to form an image on a recording medium or a scan job for reading an original document to generate image data based on the original document, and the communication device executes the print processing in a case where the communication device receives the print job.

10. The control method according to claim 1, wherein the predetermined program is a printer driver.

11. The control method according to claim 1, wherein the predetermined program is a printer driver having no language monitor.

12. The control method according to claim 1, wherein the predetermined program is a Version 4 driver.

13. The control method according to claim 1, wherein transmission of the generated job and communication with the communication device based on the at least one other program are performed on an identical communication path.

14. The control method according to claim 13, wherein the identical communication path is a universal serial bus.

15. A medium storing a predetermined program for generating a job for causing a communication device to execute image processing, the program causing a computer of an information processing device having the predetermined program and at least one other program other than the predetermined program to execute acquiring processing for acquiring an exclusive object before the job is generated using the predetermined program, and generating the job by means of the predetermined program in a state in which the exclusive object acquired by means of the predetermined program is held, wherein the job is not generated by means of the predetermined program in a state in which the exclusive object is not acquired by means of the predetermined program, wherein the generated job is transmitted to the communication device in a state in which the exclusive object acquired by means of the predetermined program is held, in a state in which the exclusive object acquired by means of the predetermined program is not held, communication with the communication device based on the at least one other program is executable, and in a state in which the exclusive object acquired by means of the predetermined program is held, communication with the communication device based on the at least one other program is not performed, and in a case where the exclusive object acquired by means of the at least one other program is held, the exclusive object is not acquired by means of the predetermined program, and in a case where the exclusive object acquired by means of the at least one other program is not held, the exclusive object is acquired by means of the predetermined program.

16. A method for controlling an information processing device having a predetermined program for generating a job for causing a communication device to execute image processing, comprising:

transmitting an instruction to a server before the job is generated by means of the predetermined program, the instruction being for executing acquiring processing for acquiring an exclusive object by means of a predetermined server-side program of the server; and generating the job by means of the predetermined program in a state in which the exclusive object acquired by means of the predetermined server-side program is held, wherein the job is not generated by means of the predetermined program in a state in which the exclusive object is not acquired by means of the predetermined program, wherein the generated job is transmitted to the communication device via the server in a state in which the exclusive object acquired by means of the predetermined server-side program is held, and in a state in which the exclusive object acquired by means of the predetermined server-side program is not held, communication with the communication device based on at least one program of the server other than the predetermined server-side program is executable, and in a state in which the exclusive object acquired by means of the predetermined server-side program is held, communication with the communication device based on the at least one other program of the server other than the predetermined server-side program is not performed.

17. The control method according to claim 16, wherein in a case where the exclusive object acquired by means of the at least one other program of the server other than the predetermined server-side program is held, the exclusive object is not acquired by means of the predetermined server-side program, and in a case where the exclusive object acquired by means of the at least one other program of the server other than the predetermined server-side program is not held, the exclusive object is acquired by means of the predetermined server-side program.

18. The control method according to claim 16, wherein in a case where the generated job is transmitted to the communication device via the server, the exclusive object held by the predetermined server-side program is deleted, and in a case where the exclusive object held after acquisition by means of the predetermined program is deleted, communication with the communication device based on an instruction by the at least one other program of the server other than the predetermined server-side program is executable.

19. The control method according to claim 16, further comprising:

receiving information from the communication device via the server until processing based on the job transmitted to the communication device is completed by the communication device, the information being information on the job transmitted to the communication device, wherein in a case where the processing based on the job transmitted to the communication device has been completed by the communication device, the exclusive object held after acquisition by means of the predetermined server-side program is deleted, and in a case where the exclusive object held after acquisition by means of the predetermined server-side program is deleted, communication with the communication device by the at least one other program of the server other than the predetermined server-side program is executable.

20. The control method according to claim 16, wherein the predetermined program is a Version 4 printer driver.

* * * * *